United States Patent
Yao et al.

(10) Patent No.: US 12,187,861 B2
(45) Date of Patent: *Jan. 7, 2025

(54) CELLULOSIC PARTICLE

(71) Applicant: FUJIFILM Business Innovation Corp., Tokyo (JP)

(72) Inventors: Kenji Yao, Kanagawa (JP); Kazusei Yoshida, Kanagawa (JP); Ayu Naito, Kanagawa (JP); Yuko Iwadate, Kanagawa (JP); Takahiro Ishizuka, Kanagawa (JP); Tetsuya Taguchi, Kanagawa (JP); Hirokazu Hamano, Kanagawa (JP); Masahiro Oki, Kanagawa (JP); Hideaki Yoshikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,410

(22) Filed: Nov. 9, 2022

(65) Prior Publication Data

US 2023/0303781 A1    Sep. 28, 2023

(30) Foreign Application Priority Data

Feb. 8, 2022   (JP) ................. 2022-017987

(51) Int. Cl.
| | | |
|---|---|---|
| C08J 3/12 | (2006.01) |
| C08J 7/04 | (2020.01) |
| C08K 3/36 | (2006.01) |
| C08K 5/17 | (2006.01) |
| C09D 191/06 | (2006.01) |

(52) U.S. Cl.
CPC ............... *C08J 3/126* (2013.01); *C08J 7/042* (2013.01); *C08K 3/36* (2013.01); *C08K 5/17* (2013.01); *C09D 191/06* (2013.01); *C08J 2301/10* (2013.01); *C08J 2491/06* (2013.01)

(58) Field of Classification Search
CPC .......... C08J 3/126–128; C08J 2301/12; C08L 1/02

See application file for complete search history.

(56) References Cited

U.S. PATENT DOCUMENTS

| | | | |
|---|---|---|---|
| 2011/0062630 A1 * | 3/2011 | Honda ................ | A61P 29/00 34/372 |
| 2021/0032372 A1 | 2/2021 | Iwasa et al. | |
| 2021/0032415 A1 | 2/2021 | Yoshimura et al. | |

FOREIGN PATENT DOCUMENTS

| | | | | |
|---|---|---|---|---|
| JP | 3565952 B2 * | 9/2004 | | |
| JP | 2021021044 | 2/2021 | | |
| JP | 2021021045 | 2/2021 | | |
| JP | 6872068 | 5/2021 | | |
| WO | WO-2013166385 A1 * | 11/2013 | ............. | A61K 31/12 |
| WO | WO-2019156116 A1 * | 8/2019 | ........... | A61K 8/0241 |
| WO | WO-2021111730 A1 * | 6/2021 | | |

OTHER PUBLICATIONS

Machine translation WO2021/111730 (Year: 2023).*
Machine translation JP6872068 (Year: 2024).*
Machine translation JP3565952 (Year: 2024).*
Machine translation WO-2019156116-A1 (Year: 2024).*

* cited by examiner

*Primary Examiner* — Alexandre F Ferre
(74) *Attorney, Agent, or Firm* — JCIPRNET

(57) ABSTRACT

A cellulosic particle contains 90 parts by mass or more and 99.5 parts by mass or less of cellulose; and 0.5 parts by mass or more and 10 parts by mass or less of a cellulose derivative.

12 Claims, No Drawings

CELLULOSIC PARTICLE

CROSS-REFERENCE TO RELATED APPLICATIONS

This application is based on and claims priority under 35 USC 119 from Japanese Patent Application No. 2022-017987 filed Feb. 8, 2022.

BACKGROUND

(i) Technical Field

The present disclosure relates to a cellulosic particle.

(ii) Related Art

In Japanese Patent No. 6872068, "resin beads formed of a resin containing cellulose as a main component, wherein the particle size at a cumulative percentage of 50% in terms of volume is 50 μm or less, the sphericity is 0.7-1.0, the surface smoothness is 70-100%, the solidity is 50-100%, the five-day biodegradability measured according to JIS K6950: 2000 (ISO 14851:1999) is 20% or greater, and the content of cellulose in the resin is 90-100 mass %" are proposed.

In Japanese Unexamined Patent Application Publication No. 2021-021044, "a method for producing cellulose acetate particles, comprising: (a) dissolving cellulose acetate in an organic solvent and preparing a cellulose acetate solution; (b) obtaining an emulsion by passing the cellulose acetate solution and an aqueous medium through a gap between an outer cylinder and an inner cylinder arranged coaxially inside the outer cylinder and rotating at least one of the outer cylinder and the inner cylinder; and (c) precipitating cellulose acetate particles from the emulsion" is proposed.

SUMMARY

Aspects of non-limiting embodiments of the present disclosure relate to a cellulosic particle that may achieve high biodegradability and a reduced hygroscopic change in particle diameter compared with if containing no cellulose derivative or containing less than 0.5 parts by mass or 10 parts by mass of a cellulose derivative.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a cellulosic particle containing 90 parts by mass or more and 99.5 parts by mass or less of cellulose; and 0.5 parts by mass or more and 10 parts by mass or less of a cellulose derivative.

DETAILED DESCRIPTION

Exemplary embodiments of the present disclosure will now be described. The following description and the Examples are for illustrating exemplary embodiments and do not limit the scope of aspects of the present disclosure.

In a series of numerical ranges presented herein, the upper or lower limit of a numerical range may be substituted with that of another in the same series. The upper or lower limit of a numerical range, furthermore, may be substituted with a value indicated in the Examples section.

A constituent may be a combination of multiple substances.

If a composition contains a combination of multiple substances as one of its constituents, the amount of the constituent represents the total amount of the substances in the composition unless stated otherwise.

Cellulosic Particles

Cellulosic particles according to an exemplary embodiment contain 90 parts by mass or more and 99.5 parts by mass or less of cellulose; and 0.5 parts by mass or more and 10 parts by mass or less of a cellulose derivative.

Configured as described above, the cellulosic particles according to this exemplary embodiment may achieve high biodegradability and a reduced hygroscopic change in particle diameter.

Due to the issue of marine debris, there is a need for biodegradable resin particles. In particular, cellulose-based particles, or cellulosic particles, have been used in various practical applications, such as cosmetics, by virtue of their rapid biodegradation in all of compost, activated sludge, and seawater environments.

Against this background, it has been reported that rapidly biodegradable cellulosic particles can be produced by saponifying particles of a cellulose acetate soluble in organic solvents (e.g., Japanese Unexamined Patent Application Publication No. 2021-021044).

Cellulosic particles, however, are highly hygroscopic; they swell and grow in particle diameter by absorbing water in the air or the product to which they are applied.

To address this, the cellulosic particles according to this exemplary embodiment are made to contain 0.5 parts by mass or more and 10 parts by mass or less of a cellulose derivative per 90 parts by mass or more and 99.5 parts by mass or less of cellulose.

Cellulose derivatives also absorb water and swell, but to a lesser extent than cellulose. If cellulose and a cellulose derivative are allowed to coexist, the likely outcome is that the change in particle diameter will be intermediate between that with cellulose and that with the cellulose derivative. Allowing cellulose and a cellulose derivative in a ratio of quantities as specified above, however, may result in a smaller magnitude of the hygroscopic change than with particles of the cellulose derivative alone. This is because their structures are similar; because islands of the cellulose derivative are dispersed in the sea of cellulose with extremely high uniformity and because they are immiscible, the sea and the islands create spaces uniformly therebetween that may accommodate the swell, and this may help reduce the change in particle diameter.

For this reason, presumably, the cellulosic particles according to this exemplary embodiment, configured as described above, may achieve high biodegradability and a reduced hygroscopic change in particle diameter.

Specifically, by virtue of a reduced hygroscopic change in their particle diameter, the cellulosic particles according to this exemplary embodiment may help in cosmetic applications to reduce changes in the feel when touched (e.g., softness, smoothness, and velvetiness) and in spacer applications to reduce changes in the distance between substrates.

The details of the cellulosic particles according to this exemplary embodiment will now be described.

Cellulose/Cellulose Derivative

The cellulosic particles according to this exemplary embodiment contain 90 parts by mass or more and 99.5 parts by mass or less of cellulose and 0.5 parts by mass or more and 10 parts by mass or less of a cellulose derivative.

For improved biodegradability and a reduced change in particle diameter, the cellulosic particles may contain 95 parts by mass or more and 99.5 parts by mass or less of cellulose and 0.5 parts by mass or more and 5 parts by mass or less of a cellulose derivative.

If the cellulosic particles have a coating layer as described later herein, however, the core particle, covered with the coating layer, contains cellulose and the cellulose derivative in such a ratio of quantities.

For biodegradability reasons and for a reduced change in particle diameter, the cellulose may constitute 90% by mass or more of the cellulosic particles.

If the cellulosic particles have a coating layer as described later herein, however, the cellulose may constitute 90% by mass or more of the core particle, covered with the coating layer.

Cellulose

The number-average molecular weight of the cellulose may be 37000 or more, preferably 45000 or more.

There is no particular upper limit to the number-average molecular weight of the cellulose, but for example, the number-average molecular weight may be 100000 or less.

Making the number-average molecular weight of the cellulose 37000 or more may make it more likely that the cellulosic particles achieve high biodegradability and a reduced hygroscopic change in particle diameter. A possible reason is as follows.

If the number-average molecular weight of the cellulose is 37000 or more, the increase in the number of terminal hydroxyl groups per unit volume of the particles may be limited; the hygroscopic capacity of the particles, therefore, may be lower, and the hygroscopic changes in dimensions may tend to be smaller accordingly. The decrease in terminal hydroxyl groups, furthermore, may discourage the aggregation of the particles by affecting the strength of hydrogen bonds; the loss of biodegradability due to a reduced specific surface area caused by aggregation may therefore be reduced as well.

For this reason, presumably, it may be more likely that the cellulosic particles achieve high biodegradability and a reduced hygroscopic change in particle diameter.

The number-average molecular weight of the cellulose is measured by gel permeation chromatography (differential refractometer, Optilab T-rEX, Wyatt Technology;

multiangle light scattering detector, DAWN HELEOS II, Wyatt Technology; columns, one TSKgel α-M and one a-3000, Tosoh) with dimethylacetamide eluent (containing 0.1 M lithium chloride).

Cellulose Derivative

Examples of cellulose derivatives include cellulose acylates, cellulose ethers, hydroxyalkyl celluloses, and carboxymethyl cellulose.

Of these, the cellulose derivative may be a cellulose acylate in particular. Readily dispersed as fine particles in cellulose, cellulose acylates may make it more likely that the cellulosic particles will achieve a reduced hygroscopic change in particle diameter.

A cellulose acylate is a cellulose derivative in which at least a subset of the hydroxy groups in cellulose has been replaced with an acyl group (acylated). An acyl group is a group having the structure of —CO—$R^{AC}$ ($R^{AC}$ represents a hydrogen atom or hydrocarbon group.).

The cellulose acylate is, for example, a cellulose derivative represented by general formula (CA) below.

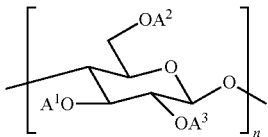

General formula (CA)

In general formula (CA), $A^1$, $A^2$, and $A^3$ each independently represent a hydrogen atom or acyl group, and n represents an integer of 2 or greater. At least a subset of the n $A^1$s, n $A^2$s, and n $A^3$s represents an acyl group. The n $A^1$s in the molecule may be all the same, not all the same, or different from each other. Likewise, the n $A^2$s in the molecule may be all the same, not all the same, or different from each other, and so may the n $A^3$s in the molecule.

For the acyl group(s) represented by $A^1$, $A^2$, and $A^3$, a hydrocarbon group in the acyl group(s) may be any of linear-chain, branched, or cyclic, but preferably is linear-chain or branched, more preferably linear-chain.

For the acyl group(s) represented by $A^1$, $A^2$, and $A^3$, a hydrocarbon group in the acyl group(s) may be any of a saturated hydrocarbon group or unsaturated hydrocarbon group, but preferably is a saturated hydrocarbon group.

The acyl group(s) represented by $A^1$, $A^2$, and $A^3$ may be acyl group(s) with one or more and six or fewer carbon atoms (C1 to C6). That is, the cellulose acylate may be a cellulose acylate in which the number of carbon atoms in the acyl group(s) is 1 or greater and 6 or less.

The acyl group(s) represented by $A^1$, $A^2$, and $A^3$ may be group(s) in which hydrogen atom(s) in the acyl group(s) has been replaced with a halogen atom (e.g., a fluorine atom, bromine atom, or iodine atom), oxygen atom, nitrogen atom, or another atom, but may be unsubstituted one(s).

Examples of acyl groups represented by $A^1$, $A^2$, and $A^3$ include the formyl, acetyl, propionyl, butyryl (butanoyl), propenoyl, and hexanoyl groups. Of these, the acyl group(s) may be C2 to C4 acyl group(s) in particular, preferably C2 or C3 acyl group(s), for an improved rate of biodegradation of the resin particles.

Examples of cellulose acylates include cellulose acetates (cellulose monoacetate, cellulose diacetate (DAC), and cellulose triacetate), cellulose acetate propionate (CAP), and cellulose acetate butyrate (CAB).

For biodegradability reasons and for a reduced change in particle diameter, the cellulose acylate may be cellulose acetate.

One cellulose acylate may be used alone, or two or more may be used in combination.

The weight-average degree of polymerization of the cellulose acylate may be 200 or more and 1000 or less, preferably 500 or more and 1000 or less, more preferably 600 or more and 1000 or less.

The weight-average degree of polymerization of the cellulose acylate is determined from the weight-average molecular weight (Mw) through the following procedure.

First, the weight-average molecular weight (Mw) of the cellulose acylate is measured as a polystyrene-equivalent value on a gel permeation chromatograph (GPC, Tosoh's HLC-8320GPC; column, TSKgel α-M) using tetrahydrofuran.

Then the Mw is divided by the molecular weight of the repeat unit of the cellulose acylate to determine the degree of polymerization of the cellulose acylate. If the substituents in the cellulose acylate are acetyl groups, for example, the molecular weight of the repeat unit is 263 at a degree of substitution of 2.4 and is 284 at a degree of substitution of 2.9.

For biodegradability reasons, the degree of substitution of the cellulose acylate may be 1.7 or more and 2.9 or less; preferably, the degree of substitution is 1.9 or more and 2.6 or less, more preferably 2.0 or more and 2.5 or less, even more preferably 2.1 or more and 2.4 or less.

The degree of substitution of a cellulose acylate is an indicator for the extent to which the hydroxy groups in the cellulose have been replaced with acyl groups. In other words, the degree of substitution serves as an indicator for the extent of acylation of the cellulose acylate. Specifically, the degree of substitution represents how many hydroxy groups, of the three in the D-glucopyranose unit of the cellulose acylate, have been replaced with acyl groups as a per-molecule average. The degree of substitution is determined by $^1$H-NMR (JMN-ECA, JEOL RESONANCE) from the ratio of the integrals of peaks between the hydrogens from the cellulose and the hydrogens from the acyl groups.

One such cellulose acylate may be used alone, or multiple ones may be used.

Extra Constituents

The cellulosic particles according to this exemplary embodiment may contain extra constituents. If the cellulosic particles have a coating layer as described later herein, however, the extra constituents are contained in the core particle, covered with the coating layer.

Examples of extra constituents include plasticizers, flame retardants, compatibilizers, release agents, light stabilizers, weathering agents, coloring agents, pigments, modifiers, anti-dripping agents, antistatic agents, anti-hydrolysis agents, fillers, reinforcing agents (glass fiber, carbon fiber, talc, clay, mica, glass flakes, milled glass, glass beads, crystalline silica, alumina, silicon nitride, aluminum nitride, boron nitride, etc.), acid acceptors for preventing acetic acid release (oxides, such as magnesium oxide and aluminum oxide; metal hydroxides, such as magnesium hydroxide, calcium hydroxide, aluminum hydroxide, and hydrotalcite; calcium carbonate; talc; etc.), and reactive trapping agents (e.g., epoxy compounds, acid anhydride compounds, carbodiimides, etc.).

The amount of each extra constituent may be 0% by mass or more and 5% by mass or less of the cellulosic particles (or core particles) as a whole. In this context, "0% by mass" means the cellulosic particles (or core particles) are free of that extra constituent.

Cellulosic Particles Having a Coating Layer

The cellulosic particles according to this exemplary embodiment may be cellulosic particles each including a core particle containing cellulose and a cellulose derivative in a ratio of quantities as specified above and a coating layer covering the core particle and containing at least one selected from the group consisting of a polyamine compound, a wax, a linear-chain saturated fatty acid, a hydroxy fatty acid, and an amino acid compound (hereinafter also referred to as "cellulosic particles having a coating layer").

Configuring the cellulosic particles according to this exemplary embodiment in this way may make it more likely that the cellulosic particles achieve high biodegradability and a reduced hygroscopic change in particle diameter. A possible reason is as follows.

Polyamine compounds experience little hygroscopic change in dimensions compared with cellulose; the adhesion of a polyamine compound to the surface of the cellulosic particles with its affinity for the hydroxyl groups in the cellulose, therefore, may help further reduce the change in particle diameter. When adhering, the polyamine compound does not cover the surface completely; it leaves spaces in places. Although the biodegradability of polyamines is inferior when compared with that of cellulose, the superior biodegradability of the cellulose is probably not impaired because microorganisms can pass through the spaces in the surface, and negative impacts are minor because the amount of polyamine added is very small; using a polyamine, therefore, may help achieve superior biodegradability.

Waxes and linear-chain saturated fatty acids are highly water-repellent in themselves, so covering the surface of the cellulosic particles with a wax and/or a linear-chain saturated fatty acid may help limit water absorption by the cellulose and, therefore, may help further reduce the change in particle diameter. These compounds, furthermore, have a strong tendency to self-aggregate and can undergo partial self-aggregation on the surface of cellulose, too; the wax and/or fatty acid, therefore, can fail to cover the surface completely, leaving gaps. Because microorganisms can pass through these gaps, the superior biodegradability of the cellulose is probably not impaired, and the covering compound(s) itself is also biodegradable; this may help the particles achieve overall superior biodegradability.

Hydroxy fatty acids are water-repellent in themselves like linear-chain saturated fatty acids and may help further reduce the change in particle diameter. By virtue of having a hydroxyl group, furthermore, hydroxy fatty acids are superior in affinity for cellulose; the change in particle diameter may be maintained well, for example even if the cellulosic particles take strong impact. Because their fatty acid moiety self-aggregates easily, hydroxy fatty acids may help achieve superior biodegradability with a gap effect like linear-chain saturated fatty acids.

As for amino acid compounds, they have a strong tendency to form flat-shaped crystals after coating and cover the surface of the cellulosic particles speedily. Because their own hygroscopic capacity is smaller than that of cellulose, they may help further reduce the changes in the dimensions of the cellulosic particles. Amino acid compounds may also help achieve superior biodegradability because they create gaps between their crystals.

For this reason, presumably, it may be more likely that the cellulosic particles achieve high biodegradability and a reduced hygroscopic change in particle diameter.

For the cellulosic particles according to this exemplary embodiment, cellulose-based core particles may be produced through, for example, the saponification of a cellulose acylate so that there will be more hydroxyl groups on the surface than inside; this may help cover the core particles with a first coating layer containing a polyamine compound with a high coverage.

Core Particle

The core particle is a cellulose-based particle.

The cellulose contained in the core particle has the same definition as the cellulose previously described herein; possible and preferred ranges of parameters are also the same as in the foregoing.

Coating Layer

The coating layer contains at least one selected from the group consisting of a polyamine compound, a wax, a linear-chain saturated fatty acid, a hydroxy fatty acid, and an amino acid compound.

Polyamine Compound

"Polyamine compound" is a generic term for aliphatic hydrocarbons having two or more primary amino groups.

Examples of polyamine compounds include a polyalkyleneimine, polyallylamine, polyvinylamine, and polylysine.

For improved biodegradability, the polyalkyleneimine may be a polyalkyleneimine including a repeat unit having a C to C6 (preferably C1 to C4, more preferably C1 or C2) alkylene group, preferably polyethyleneimine.

Examples of polyallylamines include homopolymers or copolymers of allylamine, allylamine amidosulfate, diallylamine, dimethylallylamine, etc.

Examples of polyvinylamines include products of alkali hydrolysis of poly (N-vinylformamide); a specific example is Mitsubishi Chemical's "PVAM-0595B."

The polylysine may be an extract from a natural source, may be a substance produced by a transformed microorganism, or may be a product of chemical synthesis.

The polyamine compound may be at least one selected from the group consisting of polyethyleneimine and polylysine.

Using at least one selected from the group consisting of polyethyleneimine and polylysine as polyamine compound(s) may make it more likely that the cellulosic particles achieve high biodegradability and a reduced hygroscopic change in particle diameter. A possible reason is as follows.

Polyethyleneimine and polylysine are able to adhere firmly to the cellulosic particles by virtue of their high cation density and functional groups that react with the hydroxyl groups in the cellulose. Their hydrocarbon chain, at the same time, takes up an appropriate relative area, so if they adhere to the surface of the cellulosic particles, the hydrocarbon chains tend to be exposed on the surface; these compounds, therefore, may help further reduce the change in the particle diameter of the cellulosic particles by preventing water absorption by the particles. Polyethyleneimine and polylysine, furthermore, are not dense but relatively loose in terms of structure, which means that they provide spaces for microorganisms to enter through and, therefore, may tend not to interfere with the superior biodegradability of the cellulose.

For this reason, presumably, it may be more likely that the cellulosic particles achieve high biodegradability and a reduced hygroscopic change in particle diameter.

The polyamine compound content may be 0.2% by mass or more or 2% by mass or less of the cellulosic particles as a whole.

Wax

Examples of waxes include fatty acid-containing vegetable oils, hydrocarbon waxes, and diesters.

Examples of fatty acid-containing vegetable oils include castor oil, paulownia oil, linseed oil, shortening, corn oil, soybean oil, sesame oil, rapeseed oil, sunflower oil, rice bran oil, camellia oil, coconut oil, palm oil, walnut oil, olive oil, peanut oil, almond oil, jojoba oil, cocoa butter, shea butter, neem oil, safflower oil, Japan wax, candelilla wax, rice bran wax, carnauba wax, and *Rosa damascena* flower wax.

Examples of hydrocarbon waxes include petroleum waxes (paraffin wax, microcrystalline wax, petrolatum wax, etc.) and synthetic hydrocarbon waxes (polyethylene wax, polypropylene wax, polybutene wax, Fischer-Tropsch wax, etc.).

Examples of diesters include diesters of dibasic acids, such as malic acid, glutaric acid, adipic acid, azelaic acid, sebacic acid, and dodecanedioic acid, and C10 to C25 alcohols.

The wax may be carnauba wax.

Using carnauba wax as a wax may make it more likely that the cellulosic particles achieve high biodegradability and a reduced hygroscopic change in particle diameter. A possible reason is as follows.

Carnauba wax is rich in constituents having a water-repellent structure, such as free fatty acids and hydrocarbons, so coating the surface of the cellulosic particles with it may help further reduce the changes in dimensions by preventing direct contact between water and the cellulose and limiting water absorption by the cellulosic particles. Carnauba wax, furthermore, adheres to the cellulosic particles because its constituents include free alcohols that form weak hydrogen bonds with hydroxyl groups of the cellulosic particles, but the adhesive strength is relatively weak, so there will be narrow spaces at the interface through which microorganisms can enter; carnauba wax, therefore, seems not to impair the superior biodegradability of the cellulose.

For this reason, presumably, it may be more likely that the cellulosic particles achieve high biodegradability and a reduced hygroscopic change in particle diameter.

The wax content may be 0.1% by mass or more and 2% by mass or less, preferably 0.2% by mass or more and 1% by mass or less, of the cellulosic particles as a whole.

Linear-Chain Saturated Fatty Acid

Linear-chain saturated fatty acids are saturated fatty acids in a linear-chain structure.

For improved biodegradability and reduced change in particle diameter, the linear-chain saturated fatty acid may be a linear-chain saturated fatty acid with 14 or more and 22 or fewer carbon atoms (C14 to C22). Specific examples of C14 to C22 linear-chain saturated fatty acids include behenic acid, arachidic acid, and palmitic acid.

The reason why using a linear-chain saturated fatty acid in the coating layer may help prevent the change in the particle diameter of the particles and achieve superior biodegradability appears to be as follows. The terminal carboxylic acid is able to adhere to the surface of the cellulosic particles by forming covalent bonds with, or by virtue of its ionic affinity for, hydroxyl groups in the cellulose. On the surface, linear-chain hydrocarbon groups are exposed, and they may help reduce the changes in the dimensions of the particles by preventing water absorption by the cellulose with their water repellency derived from a hydrocarbon structure. A porous portion is also created on the surface, because the hydrocarbon groups repel each other even on the surface of one single particle; since microorganisms can enter through spaces in this portion, the superior biodegradability of the cellulose is probably not impaired.

If the number of carbon atoms in the linear-chain saturated fatty acid is 14 or more, the spaces in the coating may be sufficiently large by virtue of strengthened repulsion between the hydrocarbon groups, and the entry of microorganisms may be prevented to a lesser extent; biodegradability, therefore, may be sufficiently high. If the number of carbon atoms is 22 or fewer, the loss of coated area may be limited because the repulsive force between the hydrocarbon groups may be controlled not to be excessively large; water absorption by the cellulose, and thus the associated change in particle diameter, may therefore be reduced more effectively.

Hydroxy Fatty Acid

For improved biodegradability and a reduced change in particle diameter, the hydroxy fatty acid may be a hydroxy fatty acid with 12 or more and 20 or fewer (C12 to C20) carbon atoms.

Examples of C12 to C20 hydroxy fatty acids include hydroxystearic acid, hydroxypalmitic acid, hydroxylauric acid, hydroxymyristic acid, and hydrogenated castor oil fatty acids.

The reason why using a hydroxy fatty acid in the coating layer may help prevent the change in the particle diameter of the particles and achieve superior biodegradability appears to be as follows. The hydroxyl group in the hydroxy fatty acid forms weak hydrogen bonds with hydroxyl groups of the cellulosic particles, and this causes the hydroxy fatty acid to adhere to the surface of the cellulosic particles. The fatty acid moiety of the adhering hydroxy fatty acid faces toward the outside of the particles; this moiety may help further reduce the change in the particle diameter of the particles by preventing water absorption by the cellulose. Because of low affinity of the hydrocarbon moiety of the fatty acid for the cellulose, spaces are created therebetween through which microorganisms can penetrate into the cellulosic particles; the superior biodegradability of the cellulose, therefore, is probably not interfered with.

If the number of carbon atoms in the hydroxy fatty acid is 12 or more, water absorption by the cellulose, and thus the associated change in the particle diameter of the particles, may be prevented more effectively. If the number of carbon atoms is 20 or fewer, the hydroxy fatty acid may be immobilized on the surface of the cellulosic particles with its hydroxyl group, and in that case pathways for microorganisms to enter through may be blocked to a lesser extent by virtue of a lower likelihood of entanglement between the long chains; biodegradability, therefore, may tend to be improved.

Amino Acid Compound

Examples of amino acid compounds include lauryl leucine, lauryl arginine, and myristyl leucine.

The reason why using an amino acid compound in the coating layer may help prevent the change in the particle diameter of the particles and achieve superior biodegradability appears to be as follows. The amino acid compound adheres to the surface of the cellulosic particles by virtue of ionic affinity of its amide group for hydroxyl groups in the cellulose. On the surface, the hydrocarbon moiety of the amino acid is exposed, and this moiety may help reduce the change in the particle diameter of the particles by preventing water absorption by the cellulose. The amino acid, furthermore, breaks down quickly by being attacked by microorganisms; biodegradability, therefore, may also be extremely good.

Layer Structure of the Coating Layer

The coating layer may have a first coating layer covering the core particle and containing at least one selected from the group consisting of a polyamine compound, polyvinyl alcohol, polyvinylpyrrolidone, a linear-chain saturated fatty acid, a hydroxy fatty acid, and an amino acid compound and a second coating layer covering the first coating layer and containing a wax.

In particular, the coating layer may have a first coating layer covering the core particle and containing a polyamine compound, a linear-chain saturated fatty acid, a hydroxy fatty acid, and an amino acid compound and a second coating layer covering the first coating layer and containing a wax.

The presence of such first and second coating layers in the coating layer may make it more likely that the cellulosic particles achieve high biodegradability and a reduced hygroscopic change in particle diameter. A possible reason is as follows.

Waxes are highly water-repellent, but their tendency to self-aggregate often results in the formation of large defects in the coating layer. If these defects are too large, water absorption by the cellulose, and thus the associated change in particle diameter, tend to be prevented to a lesser extent; coating the surface with a certain amount of wax may help prevent the formation of defects, but too much wax tends to affect biodegradability.

Polyamine compounds, linear-chain saturated fatty acids, hydroxy fatty acids, and amino acid compounds are inferior to waxes in water repellency but adhere firmly to the cellulosic particles; these compounds, therefore, may form a coating layer with few defects therein. Polyamine compounds, linear-chain saturated fatty acids, hydroxy fatty acids, and amino acid compounds, furthermore, adhere firmly to waxes, and vice versa; using them, therefore, may help prevent the formation of defects in a wax coating.

For this reason, presumably, the presence of first and second coating layers as described above in the coating layer may make it more likely that the cellulosic particles achieve high biodegradability and a reduced hygroscopic change in particle diameter.

Polyvalent Metal Salt

The second coating layer may contain a polyvalent metal salt.

The presence of a polyvalent metal salt in the second coating layer may make it more likely that the cellulosic particles achieve high biodegradability and a reduced hygroscopic change in particle diameter. A possible reason is as follows.

The wax contained in the second layer adheres to the layer beneath it relatively weakly. The resulting coating, therefore, tends to have many defects as a result of the self-aggregation of the wax. A polyvalent metal salt contained in the second coating layer together with the wax spreads uniformly throughout the wax and may provide starting points for the wax to aggregate uniformly and extensively; the formation of coating defects due to the self-aggregation of the wax, therefore, may be limited, and the adhesion of the second coating layer may be further improved.

For this reason, presumably, it may be more likely that the cellulosic particles achieve high biodegradability and a reduced hygroscopic change in particle diameter.

Polyvalent metal salts are compounds formed by a divalent or higher-valency metal ion and an anion.

Examples of divalent or higher-valency metal ions as a component of a polyvalent metal salt include the ions of calcium, magnesium, copper, nickel, zinc, barium, aluminum, titanium, strontium, chromium, cobalt, iron, etc.

Examples of anions as a component of a polyvalent metal salt include inorganic or organic ions. Examples of inorganic ions include the chloride, bromide, iodide, nitrate, sulfate, and hydroxide ions. Examples of organic ions include organic acid ions, such as the carboxylate ion.

Examples of polyvalent metal salts include aluminum sulfate, polyaluminum chloride, iron chloride, and calcium hydroxide.

The polyvalent metal salt content relative to the wax content may be 0.1% by mass or more and 10% by mass or less, preferably 0.2% by mass or more and 5% by mass or less, even more preferably 0.3% by mass or more and 1% by mass or less.

Amounts of Constituents in the First and Second Coating Layers

The amount of the polyamine compound, polyvinyl alcohol, polyvinylpyrrolidone, linear-chain saturated fatty acid, hydroxy fatty acid, and/or amino acid compound relative to the entire first coating layer may be 90% by mass or more and 100% by mass or less, preferably 95% by mass or more and 100% by mass or less.

The total amount of the wax and polyvalent metal salt relative to the entire second coating layer may be 90% by mass or more and 100% by mass or less, preferably 95% by mass or more and 100% by mass or less.

External Additive(s)

The cellulosic particles according to this exemplary embodiment may have at least one external additive selected from the group consisting of silicon-containing compound particles, metallic soap particles, fatty acid ester particles, and metal oxide particles.

In particular, the cellulosic particles according to this exemplary embodiment may have at least one external additive selected from the group consisting of silicon-containing compound particles and metallic soap particles.

The presence of such external additive(s) may make it more likely that the cellulosic particles according to this exemplary embodiment achieve high biodegradability and a reduced hygroscopic change in particle diameter. A possible reason is as follows.

Silicon-containing compound particles and metallic soap particles may help further encourage the prevention of water absorption by the cellulose and, therefore, the reduction of the associated change in the particle diameter of the particles because silicon-containing particles are able to adhere to particles larger than themselves by electrostatic adhesion and are much more water-repellent than likewise adhesive metal oxide particles and fatty acid ester particles. Particulate in shape, furthermore, they have a larger specific surface area than the coating material(s), and this shape effect may also help promote the prevention of the absorption of water and, therefore, the reduction of the change in particle diameter. By virtue of their particulate shape, the spaces between the particles may be sufficiently large for microorganisms to enter through; these particles, therefore, probably do not interfere with the superior biodegradability of the cellulose either.

For this reason, presumably, it may be more likely that the cellulosic particles achieve high biodegradability and a reduced hygroscopic change in particle diameter.

"Silicon-containing compound particles" refers to particles containing silicon.

The silicon-containing compound particles may be particles of silicon or may be particles containing silicon and other element(s).

The silicon-containing compound particles may be silica particles.

The silica particles can be any silica-based, or $SiO_2$-based, particles, whether crystalline or amorphous. The silica particles, furthermore, may be particles produced from a raw-material silicon compound, such as waterglass or an alkoxysilane, or may be particles obtained by crushing quartz.

Using silica particles as silicon-containing compound particles may make it more likely that the cellulosic particles achieve high biodegradability and a reduced hygroscopic change in particle diameter. A possible reason is as follows.

Silica may be particularly effective in reducing the change in particle diameter because its particles tend to have a high sphericity and by virtue of high water repellency of the element silicon; with silica, furthermore, the cellulosic particles may also be superb in biodegradability because the silica particles may ensure that microorganisms will be uniformly distributed when attacking the particles.

For this reason, presumably, it may be more likely that the cellulosic particles achieve high biodegradability and a reduced hygroscopic change in particle diameter.

Metallic soap particles are metallic soap-based particles.

In this context, "metallic soap-based particles" refers to particles containing 90% by mass or more metallic soap in relation to the particles themselves.

A metallic soap is a metallic salt of a fatty acid, formed by a fatty acid and a metal bound together.

An example of a metallic salt of a fatty acid is a metallic salt of a C10 to C25 (preferably C12 to C22) fatty acid. Examples of metallic salts of C10 to C25 fatty acids include metallic salts of stearic acid, palmitic acid, lauric acid, oleic acid, linoleic acid, and ricinoleic acid.

An example of a metal in a metallic salt of a fatty acid is a divalent metal.

Examples of metals in metallic salts of fatty acids include magnesium, calcium, aluminum, barium, and zinc.

Fatty acid ester particles are particles including fatty acid ester particles as a base component.

In this context, "particles including fatty acid ester particles as a base component" refers to particles including 90% by mass or more fatty acid ester particles in relation to the particles themselves.

An example of a fatty acid ester is the product of esterification between a C10 to C25 saturated fatty acid and a C10 to C25 alcohol.

Examples of fatty acid esters include stearyl stearate, stearyl laurate, and stearyl palmitate.

Metal oxide particles are metal oxide-based particles.

In this context, "metal oxide-based particles" refers to particles containing 90% by mass or more metal oxide in relation to the particles themselves.

The metal oxide can be an oxide of a metal other than silicon.

Examples of metal oxides include zinc oxide, magnesium oxide, iron oxide, and aluminum oxide.

For texture (specifically, feel when touched) reasons, the volume-average particle diameter of the external additive may be 1 nm or more and 100 nm or less, preferably 5 nm or more and 30 nm or less.

The volume-average particle diameter of the external additive is measured in the same way as the volume-average particle diameter of the cellulose.

The amount of the external additive may be 0.1% by mass or more and 2% by mass or less of the mass of the cellulosic particles (cellulosic particles to which the external additive has yet to be added) as a whole.

Volume-Average Particle Diameter and Upper Geometric Standard Deviation by Number GSDv The volume-average particle diameter of the cellulosic particles according to this exemplary embodiment may be 3 μm or more and less than 10 μm, preferably 4 μm or more and 9 μm or less, more preferably 5 μm or more and 8 μm or less.

Making the volume-average particle diameter of the cellulosic particles according to this exemplary embodiment 3 μm or more and less than 10 μm may make it more likely that the cellulosic particles achieve high biodegradability and a reduced hygroscopic change in particle diameter. A possible reason is as follows.

If the volume-average particle diameter is 3 μm or more, the surface area of the particles is not too large; this may help limit water absorption through the surface of the cellulose, and the associated change in particle diameter may become smaller. If the volume-average particle diameter is less than 10 μm, furthermore, the degradation process, which starts at the surface, tends to proceed uniformly by virtue of a moderately large surface area; the cellulosic particles, therefore, may tend to be superior in biodegradability.

For this reason, presumably, it may be more likely that the cellulosic particles achieve high biodegradability and a reduced hygroscopic change in particle diameter.

The upper geometric standard deviation by number GSDv of the cellulosic particles according to this exemplary embodiment may be 1.0 or greater and 1.7 or less, preferably 1.0 or greater and 1.5 or less, more preferably 1.0 or greater and 1.3 or less.

Making the upper geometric standard deviation by number GSDv of the cellulosic particles according to this exemplary embodiment 1.0 or greater and 1.7 or less may make it more likely that the cellulosic particles achieve high biodegradability and a reduced hygroscopic change in particle diameter. A possible reason is as follows.

If the GSDv is 1.0 or greater and 1.7 or less, water absorption by the cellulose caused by residual fine particles (small particles, smaller than 3 μm) may be unlikely to occur because such fine particles are scarce; the change in particle diameter, therefore, may be smaller. In that case, furthermore, superior biodegradability may tend to be achieved because the inhibition of the biodegradation process by coarse particles (large particles, exceeding 10 μm) may be less likely to occur (because the cellulosic particles break down at their surface first).

For this reason, presumably, it may be more likely that the cellulosic particles achieve high biodegradability and a reduced hygroscopic change in particle diameter.

The volume-average particle diameter and the upper geometric standard deviation GSDp of the cellulosic particles are measured as follows.

Particle diameters are measured using the LS particle size distribution analyzer "Beckman Coulter LS13 320 (Beckman Coulter)," and the cumulative distribution of particle diameters is plotted as a function of volume starting from the smallest diameter; then the particle diameter at which the cumulative percentage is 50% is determined as the volume-average particle diameter.

Separately, the cumulative distribution of particle diameters is plotted as a function of volume starting from the smallest diameter, and the particle diameters at which the cumulative percentage is 50% and 84% are defined as the number-average particle diameter, D50v, and particle diameter D84v by number, respectively. The upper geometric standard deviation by number GSDv is calculated according to the equation $GSDv=(D84v/D50v)^{1/2}$.

Sphericity

The sphericity of the cellulosic particles according to this exemplary embodiment may be 0.90 or greater, preferably 0.95 or greater, more preferably 0.97 or greater.

Making the sphericity of the cellulosic particles according to this exemplary embodiment 0.90 or greater may make it more likely that the cellulosic particles achieve high biodegradability and a reduced hygroscopic change in particle diameter. A possible reason is as follows.

If the sphericity is 0.9 or greater, the changes in dimensions may be of low anisotropy and equalized in all directions; the change in particle diameter, therefore, may be smaller. In that case, furthermore, the distance from the surface to the inner core of the particles, for which microorganisms need to go to decompose the particles, may be the shortest; biodegradability, therefore, may tend to be excellent.

For this reason, presumably, it may be more likely that the cellulosic particles achieve high biodegradability and a reduced hygroscopic change in particle diameter.

The sphericity is given by (circumference of the equivalent circle)/(circumference) [(circumference of a circle having the same projected area as the particle's image)/(circumference of the particle's projected image)]. Specifically, the sphericity is a value measured by the following method.

First, a portion of the cellulosic particles of interest is collected by aspiration in such a manner that it will form a flat stream, and this flat stream is photographed with a flash to capture the figures of the particles in a still image; then the particle images obtained are analyzed using a flow particle-image analyzer (Sysmex Corp. FPIA-3000) to give the sphericity. The number of particles sampled in the determination of the sphericity is 3500.

If the cellulosic particles have an external additive, the cellulosic particles of interest are dispersed in water containing a surfactant and then sonicated to eliminate the external additive, and the sonicated particles are subjected to the measurement.

Surface Smoothness

The surface smoothness of the cellulosic particles according to this exemplary embodiment may be 80% or higher, preferably 82% or higher and 99% or lower, more preferably 84% or higher and 98% or lower.

Making the surface smoothness of the cellulosic particles according to this exemplary embodiment 80% or higher may make it more likely that the cellulosic particles achieve high biodegradability and a reduced hygroscopic change in particle diameter. A possible reason is as follows.

If the surface smoothness is 80% or higher, the surface area of the particles is relatively small; this may help reduce water absorption by the cellulose, and the associated change in particle diameter may become smaller. In that case, furthermore, the cellulosic particles may tend to be superior in biodegradability; some biodegrading microorganisms are relatively large in size, and, if the surface smoothness is 80% or higher, such large-sized microorganisms can get access to the particle surface.

For this reason, presumably, it may be more likely that the cellulosic particles achieve high biodegradability and a reduced hygroscopic change in particle diameter.

The surface smoothness is measured through a procedure as described below.

An SEM image (magnification, 5,000 times) of the cellulosic particles, taken with a scanning electron microscope (SEM), is observed, and the smoothness M of the individual cellulosic particles is calculated according to the equation below. Then the arithmetic mean smoothness M of any ten or more cellulosic particles is reported as the surface smoothness. The closer the smoothness M is to 1, the closer the surface of the cellulosic particles is to smoothness.

$$M=(1-(S3)/(S2))\times 100$$

In this equation, S2 denotes the area of the cellulosic particle in the image (projected area), and S3 denotes, when the cellulosic particle in the image is superimposed on a circle having a projected area equal to S2, the sum of "the area outside the outline of the circle having a projected area equal to S2 and inside the outline of the cellulosic particle in the image" and "the area inside the outline of the circle having a projected area equal to S2 and outside the outline of the cellulosic particle in the image."

The method for superimposing the cellulosic particle in the image on a circle having a projected area equal to S2 is as follows.

The cellulosic particle in the image is superimposed on the circle having a projected area equal to S2 so that the area of overlap between the two images (the area inside the outline of the circle having a projected area equal to S2 and inside the outline of the cellulosic particle in the image) will be maximized.

Method for Producing the Cellulosic Particles

A method for producing the cellulosic particles may include a step of producing a particle precursor containing a cellulose acylate (particle precursor production step) and a step of saponifying the cellulose acylate contained in the particle precursor (saponification step).

Particle Precursor Production Step

A particle precursor containing a cellulose acylate is produced by any of methods (1) to (5) below.
(1) Kneading and milling, in which the ingredients are kneaded together, and the resulting mixture is milled and classified to give grains
(2) A dry process, in which the shape of the grains obtained by kneading and milling is changed with the help of a mechanical impact force or thermal energy
(3) Aggregation and coalescence, in which particle dispersions of the ingredients are mixed together, and the particles in the mixed dispersion are caused to aggregate and fused together under heat to give grains
(4) Dissolution and suspension, in which a solution of the ingredients in an organic solvent is suspended in an aqueous medium to form grains containing the ingredients
(5) Kneading and dissolution, in which the ingredients and a binder are kneaded together, the resulting mixture is pelletized by extrusion, and the resulting pellets are stirred in a solvent for the binder to form grains In this context, a cellulose acylate is a cellulose derivative in which at least one of the hydroxy groups in cellulose has been replaced with an aliphatic acyl group (acylated). Specifically, a cellulose acylate is a cellulose derivative in which at least one of the hydroxy groups in cellulose has been replaced with $-CO-R^{AC}$ ($R^{AC}$ represents an aliphatic hydrocarbon group.).

Saponification Step

Then the cellulose acylate contained in the particle precursor is saponified.

Through this step, the aliphatic acyl group(s) in the cellulose acylate is hydrolyzed, and the cellulose turns into cellulose.

The saponification step is performed by, for example, adding sodium hydroxide to a dispersion of the particle precursor and stirring the dispersion.

Coating Layer Formation Step

If cellulosic particles having a coating layer are produced, the production method may include a step of forming the coating layer (coating layer formation step) after the above saponification step.

If the coating layer formation step is performed, the coating layer is formed using the particles obtained through the above saponification step as core particles.

First, an aqueous dispersion in which the core particles are dispersed is prepared. The core particles may be cleaned with acid before the preparation of the aqueous dispersion.

Then the aqueous dispersion in which the core particles are dispersed is mixed with an aqueous solution containing the compound(s) that will form the first coating layer. This causes, for example, hydroxyl groups in the resin contained in the core particles to react with, for example, the amine sites, carboxyl groups, or amino groups in the surface-treating polymer(s) or to form hydrogen bonds with hydroxyl groups in the polymer(s), and this produces the first coating layer. Then the aqueous dispersion in which the core particles with the first coating layer formed thereon are dispersed is mixed with an emulsion containing the compound(s) that will form the second coating layer. Through this, the second coating layer is formed.

Then the cellulosic particles having coating layers are removed from the mixture. The removal of the cellulosic particles having coating layers is done by, for example, filtering the mixture. The removed cellulosic particles having coating layers may be washed with water. This may help eliminate unreacted residue of the surface-treating polymer(s). Then the cellulosic particles having coating layers are dried, giving cellulosic particles according to this exemplary embodiment.

Addition Step

External additive(s) may be added to the resulting cellulosic particles.

An example of an addition step is a treatment in which the external additive(s) is added to the cellulosic particles using equipment like a mixing mill, V-blender, Henschel mixer, or Lödige mixer.

Applications

Applications of the cellulosic particles according to this exemplary embodiment include grains for use as cosmetics, a rolling agent, an abrasive, a scrubbing agent, display spacers, a material for bead molding, light-diffusing particles, a resin-strengthening agent, a refractive index control agent, a biodegradation accelerator, a fertilizer, water-absorbent particles, toner particles, and anti-blocking particles.

An application of the cellulosic particles according to this exemplary embodiment may be cosmetics.

An application of the cellulosic particles according to this exemplary embodiment may be a cosmetic additive in particular.

Potentially superior in flexibility, the cellulosic particles according to this exemplary embodiment, if used as a cosmetic additive, may help the cosmetic product to spread well on the skin when the cosmetic product is put on the skin.

The cellulosic particles according to this exemplary embodiment can be applied as cosmetic additives, for example to base makeup cosmetics (e.g., foundation primer, concealer, foundation, and face powder); makeup cosmetics (e.g., lipstick, lip gloss, lip liner, blush, eye shadow, eyeliner, mascara, eyebrow powder, nail products, and nail care cosmetics); and skincare cosmetics (e.g., face wash, facial cleanser, toner, milky lotion, serum, face packs, face masks, and cosmetics for the care of the eye and mouth areas).

The resin particles according to this exemplary embodiment may be used as a cosmetic additive to makeup cosmetics in particular, because cosmetic additives to makeup cosmetics can need to be flexible and biodegradable.

EXAMPLES

Examples will now be described, but no aspect of the present disclosure is limited to these examples. In the following description, "parts" and "%" are all by mass unless stated otherwise.

Preparation of Materials

The following materials are prepared.

Cellulose Acylates

Cel1: Daicel "L-20"; cellulose acetate; number-average molecular weight, 47000.
Cel2: Daicel "L-50"; cellulose acetate; number-average molecular weight, 58000.
Cel3: Eastman Chemical "CAP482-20"; cellulose acetate propionate; number-average molecular weight, 75000.

Cel4: Eastman Chemical "CAB381-20"; cellulose acetate butyrate; number-average molecular weight, 70000.

Cel5: Eastman Chemical "CA398-6"; cellulose acetate; number-average molecular weight, 35000.

Cel6: Eastman Chemical "CAP482-0.5"; cellulose acetate propionate; number-average molecular weight, 25000.

Cel7: Eastman Chemical "CAP-504-0.2"; cellulose acetate propionate; number-average molecular weight, 15000.

Cel8: Shin-Etsu Chemical "METOLOSE 60SH-4000," hydroxypropyl methylcellulose; number-average molecular weight, 47000 Compounds for the First Coating Layer Polyamine Compounds Fir1: Nippon Shokubai "EPOMIN SP-003"; polyethyleneimine; molecular weight, 300

Fir2: Nippon Shokubai "EPOMIN SP-006"; polyethyleneimine; molecular weight, 600

Fir3: Nippon Shokubai "EPOMIN SP-012"; polyethyleneimine; molecular weight, 1200

Fir4: Nippon Shokubai "EPOMIN SP-018"; polyethyleneimine; molecular weight, 1800

Fir5: Nippon Shokubai "EPOMIN SP-200"; polyethyleneimine; molecular weight, 10000

Fir6: Nippon Shokubai "EPOMIN HM-2000"; polyethyleneimine; molecular weight, 30000

Fir7: Nippon Shokubai "EPOMIN P-1000"; polyethyleneimine; molecular weight, 70000

Fir8: Nittobo Medical "PAA-01"; polyallylamine; molecular weight, 1600

Fir9: Nittobo Medical "PAA-03"; polyallylamine; molecular weight, 3000

Fir10: Nittobo Medical "PAA-05"; polyallylamine; molecular weight, 5000

Fir11: Nittobo Medical "PAA-08"; polyallylamine; molecular weight, 8000

Fir12: Nittobo Medical "PAA-15C"; polyallylamine; molecular weight, 15000

Fir13: Nittobo Medical "PAA-25"; polyallylamine; molecular weight, 25000

Fir14: Mitsubishi Chemical "Polyvinylamine," polyvinylamine

Fir15: JNC "Polylysine 10," polylysine

Fir16: Ichimaru Pharcos "Polylysine 10," polylysine

Polyvinyl Alcohol and Polyvinylpyrrolidone

Fir17: Mitsubishi Chemical "GOHSENOL N-300," polyvinyl alcohol

Fir18: Nippon Shokubai "K-30," polyvinylpyrrolidone

Linear-Chain Saturated Fatty Acids

Fir19: NOF "NAA-222S," behenic acid (C22)

Fir20: FUJIFILM Shonan Wako Junyaku "Arachidic Acid," arachidic acid (C20)

Fir21: FUJIFILM Shonan Wako Junyaku "Palmitic Acid," palmitic acid (C14)

Fir22: FUJIFILM Shonan Wako Junyaku "Lauric Acid," lauric acid (C12)

Fir23: FUJIFILM Shonan Wako Junyaku "Lignoceric Acid," lignoceric acid (C24)

Hydroxy Fatty Acids

Fir24: Itoh Oil Chemicals "12-Hydroxystearic Acid," hydroxystearic acid

Fir25: NOF, "Hydrogenated Castor Oil Fatty Acid," a hydrogenated castor oil fatty acid Amino Acid Compound Fir26: Ajinomoto "AMIHOPE LL," lauroyl lysine Compounds for the Second Coating Layer Waxes Sec1: Senka "CN-100," carnauba wax Sec2: Toa Kasei "TOWAX-1F3," carnauba wax Sec3: Toa Kasei "TOWAX-1F6," carnauba wax Sec4: Toa Kasei "TOWAX-1F8," carnauba wax Sec5: Toa Kasei "TOWAX-1F12," carnauba wax Sec6: Toa Kasei "TOWAX-5B2," carnauba wax Sec7: Toa Kasei "TOWAX-1B4," carnauba wax Sec8: Toa Kasei "TOWAX-4F2," candelilla wax Sec9: Toa Kasei "TOWAX-4F3," candelilla wax Sec10: Toa Kasei "TOWAX-4F4," candelilla wax Sec11: Toa Kasei "TOWAX-6B2," *Rosa damascena* flower wax Sec12: Toa Kasei "TOWAX-6F2," sunflower seed wax Sec13: Kokura Gosei Kogyo, rice bran wax Sec14: Boso Oil and Fat "SS-1," rice bran wax Sec15: Nisshin OilliO "COSMOL 222," diisostearyl malate Polyvalent Metal Salts Sec21: FUJIFILM Wako Pure Chemical, aluminum sulfate Sec22: FUJIFILM Wako Pure Chemical, polyaluminum chloride Sec23: FUJIFILM Wako Pure Chemical, iron chloride Sec24: FUJIFILM Wako Pure Chemical, calcium hydroxide External Additives Silicon-Containing Compound Particles Sur1: Nippon Aerosil "AEROSIL R972," silica dimethyl silylate particles, average particle diameter=16 nm Sur2: Nippon Aerosil "AEROSIL RY200S," silica dimethicone silylate particles, average particle diameter=12 nm Metallic Soap Particles Sur3: NOF "MZ-2," zinc stearate particles, volume-average particle diameter=1500 nm Sur4: NOF "Magnesium Stearate S," magnesium stearate particles, volume-average particle diameter=1000 nm Fatty Acid Ester Particles Sur6: Kao "EXCEPARL SS," stearyl stearate particles, volume-average particle diameter=1000 nm Metal Oxide Particles Sur7: Sakai Chemical "FINEX-50," zinc oxide particles, volume-average particle diameter=1500 nm The volume-average particle diameters of the external additives are measured through the same procedure as the volume-average particle diameters of the cellulosic particles.

Example 1

Particle Precursor Production Step

As a cellulose acylate, 130 parts of Cell is dissolved completely in 870 parts of ethyl acetate. The resulting solution is added to a water-based liquid containing 50 parts of calcium carbonate and 500 parts of purified water, and the resulting mixture is stirred for 3 hours (hereinafter referred to as "the first stirring time"). A dispersion of 4 parts of carboxymethyl cellulose (hereinafter also referred to as "CMC") and 200 parts methyl ethyl ketone in 600 parts of purified water is added, and the resulting mixture is stirred for 5 minutes using a high-speed emulsifier. Ten parts of sodium hydroxide is added, and the resulting mixture is heated to 80° C. and stirred for 3 hours to eliminate the ethyl acetate and the methyl ethyl ketone. The same amount of diluted hydrochloric acid as the sodium hydroxide is added, the residue is collected by filtration, and the collected solids are dispersed once again in purified water to give a particle precursor dispersion (solids concentration, 10%)

Saponification Step

A mixture obtained by adding 15 parts of a 20% aqueous solution of sodium hydroxide to 500 parts of the particle precursor dispersion is stirred for 2 hours at a saponification temperature of 30° C. After the pH is adjusted to 7 with hydrochloric acid, the saponified slurry is cleaned by repeated filtration and washing until the electrical conductivity of the filtrate is 10 us/cm or less, yielding cellulosic particles.

Examples 2 to 7

Cellulosic particles are obtained through the same procedure as in Example 1, except that in the particle precursor production step, the cellulose acylate species is as in Table 1.

Examples 8 and 9

Cellulosic particles are obtained through the same procedure as in Example 1, except that in the saponification step, the 20% aqueous solution of sodium hydroxide and the duration of stirring are as in Table 1.

Comparative Examples 1 and 2

Cellulosic particles are obtained through the same procedure as in Example 1, except that in the saponification step, the 20% aqueous solution of sodium hydroxide and the duration of stirring are as in Table 1.

Example 10

Particle Precursor Production Step and Saponification Step

Cellulosic particles are obtained through the same procedure as in Example 1.

Coating Layer Formation Step

One thousand parts of the cellulosic particles, which are core particles, and 10000 parts of deionized water are mixed together to give a core particle dispersion. Seven parts of Fir16 as a compound that will form the first coating layer is added to the core particle dispersion, and the resulting mixture is stirred for 1 hour to make the compound form a coating layer. The cellulosic particles having a coating layer are cleaned by repeated filtration and washing until the electrical conductivity of the filtrate is 10 us/cm or less, yielding cellulosic particles having a coating layer.

Examples 11 to 27

Cellulosic particles having a coating layer are obtained through the same procedure as in Example 10, except that in the coating layer formation step, the species of the compound that will form the first coating layer ("First-layer compound" in Table 1) is as in Table 1.

Example 28

Particle Precursor Production Step and Saponification Step

Cellulosic particles are obtained through the same procedure as in Example 1.

Coating Layer Formation Step

One thousand parts of the cellulosic particles, which are core particles, and 10000 parts of deionized water are mixed together to give a core particle dispersion. Seven parts of Fir16 as a compound that will form the first coating layer is added to the core particle dispersion, and the resulting mixture is stirred for 1 hour to make the compound form a first coating layer, yielding a dispersion of cellulosic particles having a first coating layer.

Subsequently, an emulsion for the formation of the second coating layer is prepared by mixing 6 parts of Sec1 as a wax and 50 parts of purified water together using a high-speed emulsifier.

All of the emulsion for the formation of the second coating layer is added to the dispersion of cellulosic particles having a first coating layer, and the resulting mixture is stirred for 24 hours to make the wax form the second coating layer, yielding a dispersion of cellulosic particles having first and second coating layers.

The cellulosic particles having first and second coating layers are cleaned by repeated filtration and washing until the electrical conductivity of the filtrate is 10 us/cm or less, yielding cellulosic particles having first and second coating layers.

Examples 29 to 42

Cellulosic particles having first and second coating layers are obtained through the same procedure as in Example 28, except that in the coating layer formation step, the wax species is as in Table 1.

Example 43

Particle Precursor Production Step, Saponification Step, and Coating Layer Formation Step Cellulosic particles having first and second coating layers are obtained through the same procedure as in Example 28.

Addition Step

As an external additive, 0.6 parts of Sur1 is added to 30 parts of the cellulosic particles having first and second coating layers, and the ingredients are mixed together in a mixing mill (WONDER CRUSHER, Osaka Chemical) to give cellulosic particles having an external additive.

Examples 44 to 46, 48, and 49

Cellulosic particles having an external additive are obtained through the same procedure as in Example 43, except that in the addition step, the external additive and its amount are as in Table 1.

Examples 52 and 53

Cellulosic particles are obtained through the same procedure as in Example 43, except that in the saponification step, the 20% aqueous solution of sodium hydroxide and the duration of stirring are as in Table 1.

Comparative Examples 3 and 4

Cellulosic particles are obtained through the same procedure as in Example 43, except that in the saponification step, the 20% aqueous solution of sodium hydroxide and the duration of stirring are as in Table 1.

Examples 54 to 61

Cellulosic particles having an external additive are obtained through the same procedure as in Example 28, except that in the particle precursor production step, the amount of calcium carbonate, the first stirring time, the amount of carboxymethyl cellulose, and the amount of sodium hydroxide are as in Table 1.

Examples 62 to 65

Cellulosic particles having an external additive are obtained through the same procedure as in Example 43, except that in the coating layer formation step, the wax species is as in Table 1 and that in preparing the emulsion for the formation of the second coating layer, the polyvalent metal salt specified in Table 1, its amount being as in Table 1, is added together with the wax and the purified water.

Examples 66 to 81

Cellulosic particles are obtained through the same procedure as in the above Examples, except that the parameters are changed to those indicated in Table 1.

It should be noted that in Example 66, Cell and Cel8 are used as cellulose acylates in a ratio by mass (Cell: Cel8) =49:1.

Comparative Examples 5 to 9

The following particles are used as the cellulosic particles of each example.

Comparative Example 5: CELLULOBEADS D10 (Daito Kasei, cellulosic particles 100% saponified and 100% by mass cellulose. No coating layer and no external additive.)

Comparative Example 6: OTS-0.5A CELLULOBEADS D10 (Daito Kasei, cellulosic particles having a 100% saponified, 100% by mass cellulose core particle and a coating layer containing triethoxyoctylsilane. No external additive.)

Comparative Example 7: S-STM CELLULOBEADS D-5 (Daito Kasei, cellulosic particles having a 100% saponified, 100% by mass cellulose core particle and a coating layer containing magnesium stearate. No external additive.)

Comparative Example 8: CELLUFLOW TA25 CELLULOBEADS D-10 (JNC, cellulosic particles 0% saponified and 100% by mass diacetyl cellulose. No coating layer and no external additive.)

Comparative Example 9: CELLUFLOW C25 (JNC, cellulose-based cellulosic particles 100% saponified and 100% by mass cellulose. No coating layer and no external additive.)

Comparative Example 10

Cellulosic particles are obtained according to the procedure described in Example 1 in Japanese Patent No. 6872068. These cellulosic particles are 100% saponified and 100% by mass cellulose, having no external additive. The specific production process is as follows.

An oil phase is prepared by dissolving 250 parts by mass of diacetyl cellulose (CA398-3, Eastman Chemical) in 2500 parts by mass of ethyl acetate. An aqueous phase is prepared by dissolving 200 parts by mass of polyvinyl alcohol in 2300 parts by mass of deionized water. The prepared aqueous phase is mixed with the oil phase, and the resulting mixture is stirred at 1000 rpm for 3 minutes using a dissolver. The mixture is further stirred at 1800 rpm for 10 minutes using a dissolver, giving a suspension in which oil droplets are dispersed uniformly.

While the resulting suspension is stirred at 500 rpm, 112500 parts by mass of deionized water is introduced thereinto over 75 minutes to give a dispersion of resin particles. The resin particles are collected by filtration, washed, and then stirred in deionized water. After filtration and washing, the resulting resin particles are dispersed in 2500 parts by mass of deionized water. The pH is adjusted to 13.0 or below by adding sodium hydroxide, the dispersion is heated to 60° C. for hydrolysis at the same time, and the dispersion is neutralized with hydrochloric acid. The product is collected by filtration, washed, and then immersed in deionized water. After filtration and washing, the solids are dried and crushed to give cellulosic particles.

Comparative Example 11

Cellulosic particles are obtained according to the procedure described in Example 2 in Japanese Patent No. 6872068. These cellulosic particles are 100% saponified and 100% by mass cellulose, having no external additive. The specific production process is as follows.

An oil phase is prepared by dissolving 250 parts by mass of cellulose acetate propionate (CAP504-0.2, Eastman Chemical) in 1000 parts by mass of ethyl acetate. An aqueous phase is prepared by dissolving 100 parts of polyvinyl alcohol in 1088 parts of deionized water and stirring the resulting solution with 62.5 parts of ethyl acetate added thereto. The prepared aqueous phase is mixed with the oil phase, and the resulting mixture is stirred at 1000 rpm for 3 minutes using a dissolver. The mixture is further stirred at 1500 rpm for 5 minutes, giving a suspension in which oil droplets are dispersed uniformly.

While the resulting suspension is stirred at 500 rpm, 21250 parts by mass of deionized water is introduced thereinto over 60 minutes to give a dispersion of resin particles. The resin particles are collected by filtration, washed, immersed in deionized water, and stirred. After filtration and washing, the solids are dried and crushed to give resin particles. The resulting resin particles are dispersed in 5000 parts by mass of deionized water. The pH is adjusted to 13.0 or below by adding sodium hydroxide, the dispersion is heated to 40° C. for hydrolysis, and then the dispersion is neutralized with acetic acid. The product is collected by filtration and washed, yielding cellulosic particles. Comparative Example 12

Cellulosic particles are obtained according to the procedure described in Example 1 in Japanese Unexamined Patent Application Publication No. 2021-021044. These cellulosic particles are 100% saponified and 100% by mass cellulose, having no coating layer and no external additive. The specific production process is as follows.

A 4.8-g portion of cyclohexanone is stirred with 0.2 g of diacetyl cellulose (L20, Daicel) added thereto. The resulting mixture is further stirred at 60° C. for 3 hours to give a solution with a diacetyl cellulose concentration of 4% by mass; this solution is the dispersed phase.

Fifty grams of purified water is stirred with 0.1 g of sodium dodecylbenzenesulfonate and 3.5 g of cyclohexanone added thereto. The resulting mixture is warmed to 60° C. to give an aqueous medium; this aqueous medium is the continuous phase. The dispersed phase, preheated to 60° C., and the continuous phase, also preheated to 60° C., are put into different inlets of a rotational cylinder emulsifier (cylinder outer diameter, 78 mm; cylinder length, 215 mm; cylinder inner diameter, 80 mm; clearance, 1 mm; Tipton) at 1 mL/min using a syringe pump (high-pressure microfeeder JP-H, Furue Science) and at 10 mL/min using a plunger pump (NP-KX-840, Nihon Seimitsu Kagaku), respectively, and emulsified at a cylinder rotational frequency of 2000 rpm for an emulsification period of 138 seconds to give an oil-in-water emulsion.

This oil-in-water emulsion is cooled to 5° C. and fed to a double-tube merger, and the diacetyl cellulose is precipitated by feeding purified water at 10 mL/min, yielding a solution of particle slurry.

The resulting diacetyl cellulose particles are put into a mixture of 7 parts by mass of a 55% by mass aqueous solution of methanol and 3.5 parts by mass of a 20% by mass aqueous solution of sodium hydroxide, the concentrations being relative to the diacetyl cellulose particles, and the diacetyl cellulose particles are saponified by stirring the resulting mixture at 35° C. for 20 hours, yielding cellulosic particles.

Comparative Example 13

Cellulosic particles are obtained according to the procedure described in Example 1 in Japanese Unexamined Patent Application Publication No. 2021-021045. These cellulosic particles are 100% saponified and 100% by mass cellulose, having no coating layer and no external additive. The specific production process is as follows.

Diacetyl cellulose (L20, Daicel) is added to 64 g of ethyl acetate and 16 g of acetone, and the resulting mixture is stirred at 50° C. for 3 hours or longer to give a diacetyl cellulose solution with a concentration of 10% by mass.

This solution is poured into 82.8 g of purified water at 50° C. containing 0.18 g of sodium dodecylbenzenesulfonate and 6.2 g of ethyl acetate, and the resulting mixture is stirred at a rotational frequency of 300 rpm for 10 minutes to yield a crude emulsion. A porous membrane (a cylindrical SPG membrane having an outer diameter of 10 mm, a membrane thickness of 1 mm, and a pore diameter of 50 μm; SPG Technology) is immersed in a container holding 331.2 g of purified water at 50° C. containing 0.71 g of sodium dodecylbenzenesulfonate and 24.9 g of ethyl acetate, and the container in which the crude emulsion has been prepared is coupled to the inside of this porous membrane. The crude emulsion is forced through the membrane by applying a pressure of 100 kPa to the container in which the crude emulsion has been prepared; membrane emulsification induced by this gives an oil droplet-in-water emulsion.

This emulsion is cooled, and when its temperature is 20° C., 444 mL of purified water is added dropwise, giving spherical diacetyl cellulose particles. Then the dispersion is centrifuged and filtered, and the residual diacetyl cellulose particles are washed thoroughly with a plenty of water and collected by filtration, yielding 2.8 g of diacetyl cellulose particles.

The resulting diacetyl cellulose particles are put into a mixture of a 55% aqueous solution of methanol (7 parts by mass) and a 20% by mass aqueous solution of sodium hydroxide (3.5 parts by mass), the concentrations being relative to the diacetyl cellulose particles, and the diacetyl cellulose is saponified by stirring the resulting mixture at 35° C. for 20 hours, yielding cellulosic particles.

Evaluations

For the cellulosic particles obtained in each example or comparative example, the following particle characteristics are measured according to the methods described previously herein.

Amounts in parts by mass of cellulose and the cellulose derivative(s): The cellulosic particles that have yet to be coated (or cellulosic particles from which the coating layer(s) has been stripped) are dried in a vacuum at 40° C. for 8 hours, then 10 g of them are weighed out and put into 200 g of tetrahydrofuran, and the resulting mixture is stirred at 50° C. for 8 hours. Then undissolved particles are collected by filtration and dried in a vacuum at 40° C. for 8 hours once again, and the dried particles are weighed; the measured weight is Wr (g). The amount, in parts by mass, of cellulose in the particles is calculated according to equation (1), and the amount in parts by mass of the cellulose derivative(s) is calculated according to equation (2).

$$\text{Amount in parts by mass of cellulose} = (Wr/10) \times 100 \quad (1)$$

$$\text{Amount in parts by mass of cellulose derivatives} = ((10-Wr)/10) \times 100 \quad (2)$$

Volume-average particle diameter of the cellulosic particles ("Particle diameter" in the tables)

Upper geometric standard deviation by number of the cellulosic particles ("GSDv" in the tables)

Sphericity of the cellulosic particles

Number-average molecular weight of the cellulose in the cellulosic particles ("Mn" in the tables)

Surface smoothness of the cellulosic particles

Percentage Biodegradation

The percentage biodegradation (60-day percentage biodegradation) of the cellulosic particles obtained is measured and calculated as per JIS K6950:2000 (ISO 14851:1999).

Specifically, the percentage biodegradation is calculated from the oxygen demands of the cellulosic particles of interest (hereinafter, the test substance) and a reference substance according to the equation below. If the percentage biodegradation is 60% or higher, the cellulosic particles are considered highly biodegradable.

$$\text{Biodegradability (\%)} = (A-B)/C \times 100$$

A (mg): Biochemical oxygen demand of the test substance

B (mg): Mean biochemical oxygen demand of the control substance

C (mg): Theoretical maximum amount of oxygen required to oxidize the test substance The oxygen demands, furthermore, are measured using a closed-system oxygen consumption meter under the following conditions.

Inoculum: Activated sludge in an aerobic reactor at a sewage treatment plant basically for the treatment of domestic liquid waste Control substance: Microcrystalline cellulose Test substance concentration: 100 mg/L Control substance concentration: 100 mg/L Inoculum concentration: 150 mg/L Test solution volume: 300 mL Testing temperature: 25° C.±1° C.

Duration of incubation: 30 days

Percentage Change in Particle Diameter

The particle diameter of the cellulosic particles is measured using a laser diffraction-scattering particle size distribution analyzer (Microtrac MT3300EX, MicrotracBEL Corporation) immediately after water elimination by drying in a vacuum at 40° C. The dispersant used for the measurement is methanol, and the measurement is performed by adding 0.2 g of the cellulosic particles to it; the percentage change in particle diameter is determined according to equation (3), where the "Dry particle diameter" is a particle diameter at which the cumulative percentage by volume is 50%, and the "Hydrated particle diameter" is that in the same measurement performed immediately after 48 hours of immersion in water at 30° C.

Percentage change in particle diameter (%)=((Hydrated particle diameter−Dry particle diameter)/Dry particle diameter)×100      (3)

TABLE 1-1

|  | | Particle precursor production step | | | | Saponification step | | |
| --- | --- | --- | --- | --- | --- | --- | --- | --- |
|  | Particle number | Resin species | Amount of calcium carbonate (parts) | First stirring time (hr) | Amount of CMC (parts) | Amount of sodium hydroxide (g) | Amount of 20% NaOHaq (parts) | Saponification temperature (° C.) | Duration of stirring (hr) |
| Example 1 | Par301 | Cel1 | 50 | 3 | 4 | 10 | 15 | 30 | 2 |
| Example 2 | Par302 | Cel2 | 50 | 3 | 4 | 10 | 15 | 30 | 2 |
| Example 3 | Par303 | Cel3 | 50 | 3 | 4 | 10 | 15 | 30 | 2 |
| Example 4 | Par304 | Cel4 | 50 | 3 | 4 | 10 | 15 | 30 | 2 |
| Example 5 | Par305 | Cel5 | 50 | 3 | 4 | 10 | 15 | 30 | 2 |
| Example 6 | Par306 | Cel6 | 50 | 3 | 4 | 10 | 15 | 30 | 2 |
| Example 7 | Par307 | Cel7 | 50 | 3 | 4 | 10 | 15 | 30 | 2 |
| Example 8 | Par308 | Cel1 | 50 | 3 | 4 | 10 | 13 | 30 | 1 |
| Comparative Example 1 | Par309 | Cel1 | 50 | 3 | 4 | 10 | 10 | 30 | 1 |
| Example 9 | Par310 | Cel1 | 50 | 3 | 4 | 10 | 16.5 | 30 | 6 |
| Comparative Example 2 | Par311 | Cel2 | 50 | 3 | 4 | 10 | 17 | 30 | 6 |
| Example 10 | Par312 | Cel1 | 50 | 3 | 4 | 10 | 15 | 30 | 2 |
| Example 11 | Par313 | Cel1 | 50 | 3 | 4 | 10 | 15 | 30 | 2 |
| Example 12 | Par314 | Cel1 | 50 | 3 | 4 | 10 | 15 | 30 | 2 |
| Example 13 | Par315 | Cel1 | 50 | 3 | 4 | 10 | 15 | 30 | 2 |
| Example 14 | Par316 | Cel1 | 50 | 3 | 4 | 10 | 15 | 30 | 2 |
| Example 15 | Par317 | Cel1 | 50 | 3 | 4 | 10 | 15 | 30 | 2 |
| Example 16 | Par318 | Cel1 | 50 | 3 | 4 | 10 | 15 | 30 | 2 |
| Example 17 | Par319 | Cel1 | 50 | 3 | 4 | 10 | 15 | 30 | 2 |
| Example 18 | Par320 | Cel1 | 50 | 3 | 4 | 10 | 15 | 30 | 2 |
| Example 19 | Par321 | Cel1 | 50 | 3 | 4 | 10 | 15 | 30 | 2 |
| Example 20 | Par322 | Cel1 | 50 | 3 | 4 | 10 | 15 | 30 | 2 |
| Example 21 | Par323 | Cel1 | 50 | 3 | 4 | 10 | 15 | 30 | 2 |
| Example 22 | Par324 | Cel1 | 50 | 3 | 4 | 10 | 15 | 30 | 2 |
| Example 23 | Par325 | Cel1 | 50 | 3 | 4 | 10 | 15 | 30 | 2 |
| Example 24 | Par326 | Cel1 | 50 | 3 | 4 | 10 | 15 | 30 | 2 |
| Example 25 | Par327 | Cel1 | 50 | 3 | 4 | 10 | 15 | 30 | 2 |
| Example 26 | Par328 | Cel1 | 50 | 3 | 4 | 10 | 15 | 30 | 2 |
| Example 27 | Par329 | Cel1 | 50 | 3 | 4 | 10 | 15 | 30 | 2 |

TABLE 1-2

|  | | | | Coating layer formation step | | | | | | | |
| --- | --- | --- | --- | --- | --- | --- | --- | --- | --- | --- | --- |
|  | | Cellulose, | Cellulose derivative(s), | First-layer compound | | Second-layer compound, wax | | Second-layer compound, polyvalent metal salt | | Addition step External additive | |
|  | Particle number | parts by mass | parts by mass | Species | Amount (parts) | Species | Amount (parts) | Species | Amount (parts) | Species | Amount (parts) |
| Example 1 | Par301 | 99 | 1 | | | | | | | | |
| Example 2 | Par302 | 98.8 | 1.2 | | | | | | | | |
| Example 3 | Par303 | 97.5 | 2.5 | | | | | | | | |
| Example 4 | Par304 | 96.2 | 3.8 | | | | | | | | |
| Example 5 | Par305 | 98.9 | 1.1 | | | | | | | | |
| Example 6 | Par306 | 98.4 | 1.6 | | | | | | | | |
| Example 7 | Par307 | 98 | 2 | | | | | | | | |
| Example 8 | Par308 | 90.2 | 9.8 | | | | | | | | |
| Comparative Example 1 | Par309 | 89.7 | 10.3 | | | | | | | | |
| Example 9 | Par310 | 99.4 | 0.6 | | | | | | | | |
| Comparative Example 2 | Par311 | 99.7 | 0.3 | | | | | | | | |
| Example 10 | Par312 | 99 | 1 | Fir16 | 7 | | | | | | |
| Example 11 | Par313 | 978 | 2.2 | Fir1 | 7 | | | | | | |
| Example 12 | Par314 | 98.1 | 1.9 | Fir2 | 7 | | | | | | |
| Example 13 | Par315 | 97 | 3 | Fir3 | 7 | | | | | | |
| Example 14 | Par316 | 97.5 | 2.5 | Fir4 | 7 | | | | | | |
| Example 15 | Par317 | 99.3 | 0.7 | Fir5 | 7 | | | | | | |
| Example 16 | Par318 | 97 | 3 | Fir6 | 7 | | | | | | |
| Example 17 | Par319 | 95.9 | 4.1 | Fir7 | 7 | | | | | | |
| Example 18 | Par320 | 97 | 3 | Fir8 | 7 | | | | | | |
| Example 19 | Par321 | 97 | 3 | Fir9 | 7 | | | | | | |

TABLE 1-2-continued

| | | Cellulose, parts by mass | Cellulose derivative(s), parts by mass | Coating layer formation step | | | | | | Addition step External additive | |
|---|---|---|---|---|---|---|---|---|---|---|---|
| | | | | First-layer compound | | Second-layer compound, wax | | Second-layer compound, polyvalent metal salt | | | |
| | Particle number | | | Species | Amount (parts) | Species | Amount (parts) | Species | Amount (parts) | Species | Amount (parts) |
| Example 20 | Par322 | 97.5 | 2.5 | Fir10 | 7 | | | | | | |
| Example 21 | Par323 | 96 | 4 | Fir11 | 7 | | | | | | |
| Example 22 | Par324 | 91 | 9 | Fir12 | 7 | | | | | | |
| Example 23 | Par325 | 99 | 1 | Fir13 | 7 | | | | | | |
| Example 24 | Par326 | 95.8 | 4.2 | Fir14 | 7 | | | | | | |
| Example 25 | Par327 | 96 | 4 | Fir15 | 7 | | | | | | |
| Example 26 | Par328 | 97 | 3 | Fir17 | 7 | | | | | | |
| Example 27 | Par329 | 97.1 | 2.9 | Fir18 | 7 | | | | | | |

TABLE 1-3

| | Particle number | Resin species | Particle precursor production step | | | | Saponification step | | |
|---|---|---|---|---|---|---|---|---|---|
| | | | Amount of calcium carbonate (parts) | First stirring time (hr) | Amount of CMC (parts) | Amount of sodium hydroxide (g) | Amount of 20% NaOHaq (parts) | Saponification temperature (° C.) | Duration of stirring (hr) |
| Example 28 | Par330 | Cel1 | 50 | 3 | 4 | 10 | 15 | 30 | 2 |
| Example 29 | Par331 | Cel1 | 50 | 3 | 4 | 10 | 15 | 30 | 2 |
| Example 30 | Par332 | Cel1 | 50 | 3 | 4 | 10 | 15 | 30 | 2 |
| Example 31 | Par333 | Cel1 | 50 | 3 | 4 | 10 | 15 | 30 | 2 |
| Example 32 | Par334 | Cel1 | 50 | 3 | 4 | 10 | 15 | 30 | 2 |
| Example 33 | Par335 | Cel1 | 50 | 3 | 4 | 10 | 15 | 30 | 2 |
| Example 34 | Par336 | Cel1 | 50 | 3 | 4 | 10 | 15 | 30 | 2 |
| Example 35 | Par337 | Cel1 | 50 | 3 | 4 | 10 | 15 | 30 | 2 |
| Example 36 | Par338 | Cel1 | 50 | 3 | 4 | 10 | 15 | 30 | 2 |
| Example 37 | Par339 | Cel1 | 50 | 3 | 4 | 10 | 15 | 30 | 2 |
| Example 38 | Par340 | Cel1 | 50 | 3 | 4 | 10 | 15 | 30 | 2 |
| Example 39 | Par341 | Cel1 | 50 | 3 | 4 | 10 | 15 | 30 | 2 |
| Example 40 | Par342 | Cel1 | 50 | 3 | 4 | 10 | 15 | 30 | 2 |
| Example 41 | Par343 | Cel1 | 50 | 3 | 4 | 10 | 15 | 30 | 2 |
| Example 42 | Par344 | Cel1 | 50 | 3 | 4 | 10 | 15 | 30 | 2 |
| Example 43 | Par345 | Cel1 | 50 | 3 | 4 | 10 | 15 | 30 | 2 |
| Example 44 | Par346 | Cel1 | 50 | 3 | 4 | 10 | 15 | 30 | 2 |
| Example 45 | Par347 | Cel1 | 50 | 3 | 4 | 10 | 15 | 30 | 2 |
| Example 46 | Par348 | Cel1 | 50 | 3 | 4 | 10 | 15 | 30 | 2 |
| Example 48 | Par350 | Cel1 | 50 | 3 | 4 | 10 | 15 | 30 | 2 |
| Example 49 | Par351 | Cel1 | 50 | 3 | 4 | 10 | 15 | 30 | 2 |
| Example 52 | Par354 | Cel1 | 50 | 3 | 4 | 10 | 13 | 30 | 1 |
| Comparative Example 3 | Par355 | Cel1 | 50 | 3 | 4 | 10 | 10 | 30 | 1 |
| Example 53 | Par356 | Cel1 | 50 | 3 | 4 | 10 | 16.5 | 30 | 6 |
| Comparative Example 4 | Par357 | Cel1 | 50 | 3 | 4 | 10 | 17 | 30 | 6 |

TABLE 1-4

| | | Cellulose, parts by mass | Cellulose derivative(s), parts by mass | Coating layer formation step | | | | | | Addition step External additive | |
|---|---|---|---|---|---|---|---|---|---|---|---|
| | | | | First-layer compound | | Second-layer compound, wax | | Second-layer compound, polyvalent metal salt | | | |
| | Particle number | | | Species | Amount (parts) | Species | Amount (parts) | Species | Amount (parts) | Species | Amount (parts) |
| Example 28 | Par330 | 99.3 | 0.7 | Fir16 | 7 | Sec1 | 6 | | | | |
| Example 29 | Par331 | 97.5 | 2.5 | Fir16 | 7 | Sec2 | 6 | | | | |
| Example 30 | Par332 | 99.2 | 0.8 | Fir16 | 7 | Sec3 | 6 | | | | |
| Example 31 | Par333 | 99.2 | 0.8 | Fir16 | 7 | Sec4 | 6 | | | | |
| Example 32 | Par334 | 96.9 | 3.1 | Fir16 | 7 | Sec5 | 6 | | | | |
| Example 33 | Par335 | 98.1 | 2.9 | Fir16 | 7 | Sec6 | 6 | | | | |
| Example 34 | Par336 | 97 | 3 | Fir16 | 7 | Sec7 | 6 | | | | |

TABLE 1-4-continued

|  |  |  |  | Coating layer formation step | | | | | |
|  | | | | First-layer compound | | Second-layer compound, wax | | Second-layer compound, polyvalent metal salt | | Addition step External additive | |
|  | Particle number | Cellulose, parts by mass | Cellulose derivative(s), parts by mass | Species | Amount (parts) | Species | Amount (parts) | Species | Amount (parts) | Species | Amount (parts) |
| --- | --- | --- | --- | --- | --- | --- | --- | --- | --- | --- | --- |
| Example 35 | Par337 | 97 | 3 | Fir16 | 7 | Sec8 | 6 | | | | |
| Example 36 | Par338 | 95.2 | 4.8 | Fir16 | 7 | Sec9 | 6 | | | | |
| Example 37 | Par339 | 95.2 | 4.8 | Fir16 | 7 | Sec10 | 6 | | | | |
| Example 38 | Par340 | 96.5 | 3.5 | Fir16 | 7 | Sec11 | 6 | | | | |
| Example 39 | Par341 | 94.3 | 5.7 | Fir16 | 7 | Sec12 | 6 | | | | |
| Example 40 | Par342 | 97 | 3 | Fir16 | 7 | Sec13 | 6 | | | | |
| Example 41 | Par343 | 96 | 4 | Fir16 | 7 | Sec14 | 6 | | | | |
| Example 42 | Par344 | 95.6 | 4.4 | Fir16 | 7 | Sec15 | 6 | | | | |
| Example 43 | Par345 | 99.4 | 0.6 | Fir16 | 7 | Sec1 | 6 | | | Sur1 | 0.6 |
| Example 44 | Par346 | 97.8 | 2.2 | Fir16 | 7 | Sec1 | 6 | | | Sur2 | 0.6 |
| Example 45 | Par347 | 98.1 | 1.9 | Fir16 | 7 | Sec1 | 6 | | | Sur3 | 0.6 |
| Example 46 | Par348 | 99.2 | 0.8 | Fir16 | 7 | Sec1 | 6 | | | Sur4 | 0.6 |
| Example 48 | Par350 | 98 | 2 | Fir16 | 7 | Sec1 | 6 | | | Sur6 | 0.6 |
| Example 49 | Par351 | 96.7 | 3.3 | Fir16 | 7 | Sec1 | 6 | | | Sur7 | 0.6 |
| Example 52 | Par354 | 90.2 | 9.8 | Fir16 | 7 | Sec1 | 6 | | | Sur1 | 0.6 |
| Comparative Example 3 | Par355 | 89.7 | 10.3 | Fir16 | 7 | Sec1 | 6 | | | Sur1 | 0.6 |
| Example 53 | Par356 | 99.3 | 0.7 | Fir16 | 7 | Sec1 | 6 | | | Sur1 | 0.6 |
| Comparative Example 4 | Par357 | 99.7 | 0.3 | Fir16 | 7 | Sec1 | 6 | | | Sur1 | 0.6 |

TABLE 1-5

|  |  |  | Particle precursor production step | | | | | Saponification step | | |
|  | Particle number | Resin species | Amount of calcium carbonate (parts) | First stirring time (hr) | Amount of CMC (parts) | Amount of sodium hydroxide (g) | Amount of 20% NaOHaq (parts) | Saponification temperature (° C.) | Duration of stirring (hr) |
| --- | --- | --- | --- | --- | --- | --- | --- | --- | --- |
| Example 54 | Par358 | Cel1 | 50 | 1.5 | 4 | 10 | 15 | 30 | 2 |
| Example 55 | Par359 | Cel1 | 50 | 1 | 4 | 10 | 15 | 30 | 2 |
| Example 56 | Par360 | Cel1 | 65 | 3 | 4 | 10 | 15 | 30 | 2 |
| Example 57 | Par361 | Cel1 | 70 | 3 | 4 | 10 | 15 | 30 | 2 |
| Example 58 | Par362 | Cel1 | 40 | 3 | 4 | 10 | 15 | 30 | 2 |
| Example 59 | Par363 | Cel1 | 35 | 3 | 4 | 10 | 15 | 30 | 2 |
| Example 60 | Par364 | Cel1 | 50 | 3 | 4 | 7 | 15 | 30 | 2 |
| Example 61 | Par365 | Cel1 | 50 | 3 | 4 | 5 | 15 | 30 | 2 |
| Example 62 | Par366 | Cel1 | 50 | 3 | 4 | 10 | 15 | 30 | 2 |
| Example 63 | Par367 | Cel1 | 50 | 3 | 4 | 10 | 15 | 30 | 2 |
| Example 64 | Par367 | Cel1 | 50 | 3 | 4 | 10 | 15 | 30 | 2 |
| Example 65 | Par368 | Cel1 | 50 | 3 | 4 | 10 | 15 | 30 | 2 |
| Example 66 | Par369 | Cel1 Cel8 | 50 | 3 | 4 | 10 | 15 | 30 | 2 |
| Example 67 | Par370 | Cel1 | 50 | 3 | 4 | 10 | 15 | 30 | 2 |
| Example 68 | Par371 | Cel1 | 50 | 3 | 4 | 10 | 15 | 30 | 2 |
| Example 69 | Par372 | Cel1 | 50 | 3 | 4 | 10 | 15 | 30 | 2 |
| Example 70 | Par373 | Cel1 | 50 | 3 | 4 | 10 | 15 | 30 | 2 |
| Example 71 | Par374 | Cel1 | 50 | 3 | 4 | 10 | 15 | 30 | 2 |
| Example 72 | Par375 | Cel1 | 50 | 3 | 4 | 10 | 15 | 30 | 2 |
| Example 73 | Par376 | Cel1 | 50 | 3 | 4 | 10 | 15 | 30 | 2 |
| Example 74 | Par377 | Cel1 | 50 | 3 | 4 | 10 | 15 | 30 | 2 |
| Example 75 | Par378 | Cel1 | 50 | 3 | 4 | 10 | 15 | 30 | 2 |
| Example 76 | Par379 | Cel1 | 50 | 3 | 4 | 10 | 15 | 30 | 2 |
| Example 77 | Par380 | Cel1 | 50 | 3 | 4 | 10 | 15 | 30 | 2 |
| Example 78 | Par381 | Cel1 | 50 | 3 | 4 | 10 | 15 | 30 | 2 |
| Example 79 | Par382 | Cel1 | 50 | 3 | 4 | 10 | 15 | 30 | 2 |
| Example 80 | Par383 | Cel1 | 50 | 3 | 6 | 10 | 15 | 30 | 2 |
| Example 81 | Par384 | Cel1 | 50 | 3 | 8 | 10 | 15 | 30 | 2 |

TABLE 1-6

| | | Cellulose, parts by mass | Cellulose derivative(s), parts by mass | Coating layer formation step | | | | | | Addition step External additive | |
|---|---|---|---|---|---|---|---|---|---|---|---|
| | | | | First-layer compound | | Second-layer compound, wax | | Second-layer compound, polyvalent metal salt | | | |
| | Particle number | | | Species | Amount (parts) | Species | Amount (parts) | Species | Amount (parts) | Species | Amount (parts) |
| Example 54 | Par358 | 96.8 | 3.2 | Fir16 | 7 | Sec1 | 6 | | | | |
| Example 55 | Par359 | 97.8 | 2.2 | Fir16 | 7 | Sec1 | 6 | | | | |
| Example 56 | Par360 | 97.8 | 2.2 | Fir16 | 7 | Sec1 | 6 | | | | |
| Example 57 | Par361 | 98.1 | 1.9 | Fir16 | 7 | Sec1 | 6 | | | | |
| Example 58 | Par362 | 97.8 | 2.2 | Fir16 | 7 | Sec1 | 6 | | | | |
| Example 59 | Par363 | 96.9 | 3.1 | Fir16 | 7 | Sec1 | 6 | | | | |
| Example 60 | Par364 | 98 | 2 | Fir16 | 7 | Sec1 | 6 | | | | |
| Example 61 | Par365 | 97.5 | 2.5 | Fir16 | 7 | Sec1 | 6 | | | | |
| Example 62 | Par366 | 98.1 | 2.9 | Fir16 | 7 | Sec6 | 6 | Sec21 | 0.03 | Sur1 | 0.6 |
| Example 63 | Par367 | 98.1 | 2.9 | Fir16 | 7 | Sec6 | 6 | Sec22 | 0.03 | Sur1 | 0.6 |
| Example 64 | Par367 | 98.1 | 2.9 | Fir16 | 7 | Sec6 | 6 | Sec23 | 0.03 | Sur1 | 0.6 |
| Example 65 | Par368 | 98.1 | 2.9 | Fir16 | 7 | Sec6 | 6 | Sec24 | 0.03 | Sur1 | 0.6 |
| Example 66 | Par369 | 97.5 | 2.5 | | | | | | | | |
| Example 67 | Par370 | 99 | 1 | Fir19 | 8 | | | | | | |
| Example 68 | Par371 | 99 | 1 | Fir20 | 8 | | | | | | |
| Example 69 | Par372 | 99 | 1 | Fir21 | 8 | | | | | | |
| Example 70 | Par373 | 99 | 1 | Fir22 | 8 | | | | | | |
| Example 71 | Par374 | 99 | 1 | Fir23 | 8 | | | | | | |
| Example 72 | Par375 | 99 | 1 | Fir24 | 8 | | | | | | |
| Example 73 | Par376 | 99 | 1 | Fir25 | 8 | | | | | | |
| Example 74 | Par377 | 99 | 1 | Fir26 | 8 | | | | | | |
| Example 75 | Par378 | 99 | 1 | Fir19 | 6 | | | | | | |
| Example 76 | Par379 | 99 | 1 | Fir19 | 10 | | | | | | |
| Example 77 | Par380 | 99 | 1 | Fir19 | 8 | Sec1 | 4 | | | | |
| Example 78 | Par381 | 99 | 1 | Fir19 | 8 | Sec1 | 4 | Sec21 | 0.012 | | |
| Example 79 | Par382 | 99 | 1 | Fir19 | 8 | Sec1 | 4 | Sec21 | 0.012 | Sur1 | 0.6 |
| Example 80 | Par383 | 99 | 1 | Fir16 | 7 | Sec1 | 6 | | | Sur1 | 0.6 |
| Example 81 | Par384 | 99 | 1 | Fir16 | 7 | Sec1 | 6 | | | Sur1 | 0.6 |

TABLE 2-1

| | | Particle characteristics | | | | | Biodegradation, 60 days (%) Good if 60% or higher; best if 95% or higher | Percentage change in particle diameter (%) Good if lower than 1%; best if 0.15% or lower |
|---|---|---|---|---|---|---|---|---|
| | Particles | Particle diameter (μm) | GSDv (—) | Sphericity (—) | Mn (—) | Surface smoothness (%) | | |
| Example 1 | Par301 | 8 | 1.13 | 0.98 | 46000 | 93 | 97 | 0.3 |
| Example 2 | Par302 | 7 | 1.15 | 0.98 | 58000 | 94 | 97 | 0.3 |
| Example 3 | Par303 | 7 | 1.35 | 0.96 | 71000 | 95 | 94 | 0.53 |
| Example 4 | Par304 | 8 | 1.41 | 0.95 | 48000 | 95 | 93 | 0.6 |
| Example 5 | Par305 | 6 | 1.33 | 0.97 | 35000 | 89 | 78 | 0.8 |
| Example 6 | Par306 | 7 | 1.38 | 0.95 | 24000 | 88 | 78 | 0.75 |
| Example 7 | Par307 | 8 | 1.33 | 0.96 | 13000 | 87 | 82 | 0.7 |
| Example 8 | Par308 | 7 | 1.45 | 0.98 | 47000 | 86 | 78 | 0.3 |
| Example 9 | Par310 | 8 | 1.43 | 0.98 | 47000 | 95 | 99 | 0.3 |
| Example 10 | Par312 | 7 | 1.23 | 0.99 | 47000 | 95 | 88 | 0.15 |
| Example 11 | Par313 | 8 | 1.33 | 0.95 | 45000 | 93 | 80 | 0.21 |
| Example 12 | Par314 | 7 | 1.31 | 0.98 | 48000 | 93 | 77 | 0.21 |
| Example 13 | Par315 | 6 | 1.39 | 0.97 | 46000 | 94 | 83 | 0.21 |
| Example 14 | Par316 | 8 | 1.33 | 0.96 | 43000 | 92 | 80 | 0.22 |
| Example 15 | Par317 | 7 | 1.33 | 0.96 | 47000 | 93 | 83 | 0.19 |
| Example 16 | Par318 | 6 | 1.3 | 0.98 | 47000 | 94 | 81 | 0.22 |
| Example 17 | Par319 | 7 | 1.35 | 0.97 | 46000 | 92 | 81 | 0.22 |
| Example 18 | Par320 | 8 | 1.29 | 0.96 | 47000 | 92 | 86 | 0.22 |
| Example 19 | Par321 | 6 | 1.29 | 0.95 | 48000 | 90 | 77 | 0.22 |
| Example 20 | Par322 | 7 | 1.38 | 0.98 | 47000 | 92 | 82 | 0.2 |
| Example 21 | Par323 | 8 | 1.28 | 0.97 | 47000 | 91 | 77 | 0.22 |
| Example 22 | Par324 | 7 | 1.41 | 0.95 | 45000 | 93 | 78 | 0.21 |
| Example 23 | Par325 | 6 | 1.45 | 0.96 | 47000 | 92 | 80 | 0.19 |
| Example 24 | Par326 | 8 | 1.38 | 0.97 | 45000 | 93 | 81 | 0.22 |

TABLE 2-1-continued

| | Particles | Particle diameter (μm) | GSDv (−) | Sphericity (−) | Mn (−) | Surface smoothness (%) | Biodegradation, 60 days (%) Good if 60% or higher; best if 95% or higher | Percentage change in particle diameter (%) Good if lower than 1%; best if 0.15% or lower |
|---|---|---|---|---|---|---|---|---|
| Example 25 | Par327 | 7 | 1.35 | 0.96 | 47000 | 92 | 82 | 0.21 |
| Example 26 | Par328 | 6 | 1.36 | 0.98 | 47000 | 88 | 64 | 0.28 |
| Example 27 | Par329 | 8 | 1.41 | 0.97 | 48000 | 89 | 63 | 0.28 |

TABLE 2-2

| | Particles | Particle diameter (μm) | GSDv (−) | Sphericity (−) | Mn (−) | Surface smoothness (%) | Biodegradation, 60 days (%) Good if 60% or higher; best if 95% or higher | Percentage change in particle diameter (%) Good if lower than 1%; best if 0.15% or lower |
|---|---|---|---|---|---|---|---|---|
| Example 28 | Par330 | 8 | 1.12 | 0.98 | 46000 | 90 | 80 | 0.1 |
| Example 29 | Par331 | 8 | 1.15 | 0.98 | 47000 | 90 | 81 | 0.1 |
| Example 30 | Par332 | 7 | 1.38 | 0.98 | 47000 | 88 | 80 | 0.12 |
| Example 31 | Par333 | 7 | 1.36 | 0.96 | 45000 | 87 | 77 | 0.12 |
| Example 32 | Par334 | 8 | 1.36 | 0.98 | 47000 | 85 | 79 | 0.12 |
| Example 33 | Par335 | 7 | 1.38 | 0.98 | 47000 | 86 | 78 | 0.12 |
| Example 34 | Par336 | 8 | 1.39 | 0.96 | 45000 | 87 | 80 | 0.12 |
| Example 35 | Par337 | 7 | 1.37 | 0.98 | 47000 | 88 | 77 | 0.14 |
| Example 36 | Par338 | 6 | 1.41 | 0.96 | 46000 | 89 | 75 | 0.14 |
| Example 37 | Par339 | 7 | 1.38 | 0.98 | 47000 | 87 | 77 | 0.14 |
| Example 38 | Par340 | 8 | 1.35 | 0.98 | 47000 | 88 | 76 | 0.14 |
| Example 39 | Par341 | 8 | 1.33 | 0.98 | 47000 | 86 | 77 | 0.14 |
| Example 40 | Par342 | 7 | 1.36 | 0.97 | 48000 | 87 | 75 | 0.14 |
| Example 41 | Par343 | 6 | 1.38 | 0.98 | 47000 | 87 | 78 | 0.14 |
| Example 42 | Par344 | 7 | 1.39 | 0.96 | 45000 | 83 | 66 | 0.14 |
| Example 43 | Par345 | 6 | 1.14 | 0.98 | 47000 | 85 | 76 | 0.05 |
| Example 44 | Par346 | 8 | 1.33 | 0.99 | 45000 | 85 | 76 | 0.05 |
| Example 45 | Par347 | 7 | 1.32 | 0.96 | 47000 | 83 | 75 | 0.08 |
| Example 46 | Par348 | 8 | 1.38 | 0.96 | 47000 | 82 | 75 | 0.08 |
| Example 48 | Par350 | 7 | 1.32 | 0.98 | 47000 | 80 | 62 | 0.1 |
| Example 49 | Par351 | 8 | 1.33 | 0.98 | 45000 | 80 | 62 | 0.1 |
| Example 52 | Par354 | 6 | 1.15 | 0.98 | 47000 | 82 | 65 | 0.08 |
| Example 53 | Par356 | 6 | 1.15 | 0.98 | 47000 | 85 | 76 | 0.08 |

TABLE 2-3

| | Particles | Particle diameter (μm) | GSDv (−) | Sphericity (−) | Mn (−) | Surface smoothness (%) | Biodegradation, 60 days (%) Good if 60% or higher; best if 95% or higher | Percentage change in particle diameter (%) Good if lower than 1%; best if 0.15% or lower |
|---|---|---|---|---|---|---|---|---|
| Example 54 | Par358 | 7 | 1.69 | 0.98 | 47000 | 85 | 78 | 0.1 |
| Example 55 | Par359 | 8 | 1.74 | 0.97 | 46000 | 84 | 68 | 0.13 |
| Example 56 | Par360 | 3 | 1.44 | 0.98 | 47000 | 84 | 78 | 0.1 |
| Example 57 | Par361 | 2 | 1.45 | 0.98 | 47000 | 84 | 66 | 0.14 |
| Example 58 | Par362 | 9 | 1.38 | 0.97 | 47000 | 85 | 79 | 0.1 |
| Example 59 | Par363 | 11 | 1.31 | 0.98 | 45000 | 84 | 65 | 0.13 |
| Example 60 | Par364 | 8 | 1.33 | 0.91 | 47000 | 85 | 78 | 0.1 |

TABLE 2-3-continued

| | Particles | Particle characteristics | | | | | Biodegradation, 60 days (%) Good if 60% or higher; best if 95% or higher | Percentage change in particle diameter (%) Good if lower than 1%; best if 0.15% or lower |
|---|---|---|---|---|---|---|---|---|
| | | Particle diameter (μm) | GSDv (−) | Sphericity (−) | Mn (−) | Surface smoothness (%) | | |
| Example 61 | Par365 | 7 | 1.35 | 0.88 | 47000 | 85 | 68 | 0.12 |
| Example 62 | Par366 | 7 | 1.39 | 0.98 | 46000 | 86 | 70 | 0.03 |
| Example 63 | Par367 | 8 | 1.41 | 0.98 | 47000 | 86 | 70 | 0.03 |
| Example 64 | Par367 | 8 | 1.38 | 0.98 | 46000 | 85 | 70 | 0.03 |
| Example 65 | Par368 | 7 | 1.35 | 0.98 | 45000 | 85 | 70 | 0.03 |
| Example 66 | Par369 | 9 | 1.68 | 0.91 | 47000 | 95 | 93 | 0.75 |
| Example 67 | Par370 | 7 | 1.33 | 0.98 | 46000 | 95 | 95 | 0.15 |
| Example 68 | Par371 | 6 | 1.35 | 0.98 | 46000 | 96 | 93 | 0.16 |
| Example 69 | Par372 | 7 | 1.4 | 0.97 | 47000 | 95 | 92 | 0.17 |
| Example 70 | Par373 | 8 | 1.41 | 0.96 | 46000 | 93 | 92 | 0.22 |
| Example 71 | Par374 | 7 | 1.4 | 0.96 | 47000 | 94 | 79 | 0.17 |
| Example 72 | Par375 | 7 | 1.34 | 0.97 | 46000 | 95 | 92 | 0.15 |
| Example 73 | Par376 | 6 | 1.38 | 0.97 | 47000 | 95 | 91 | 0.15 |
| Example 74 | Par377 | 7 | 1.45 | 0.93 | 46000 | 95 | 91 | 0.15 |
| Example 75 | Par378 | 7 | 1.37 | 0.96 | 46000 | 96 | 95 | 0.15 |
| Example 76 | Par379 | 8 | 1.44 | 0.96 | 47000 | 95 | 93 | 0.15 |
| Example 77 | Par380 | 7 | 1.38 | 0.95 | 46000 | 85 | 85 | 0.1 |
| Example 78 | Par381 | 6 | 1.33 | 0.97 | 47000 | 86 | 80 | 0.07 |
| Example 79 | Par382 | 7 | 1.45 | 0.95 | 46000 | 83 | 78 | 0.03 |
| Example 80 | Par383 | 7 | 1.44 | 0.94 | 46000 | 82 | 78 | 0.11 |
| Example 81 | Par384 | 8 | 1.47 | 0.91 | 46000 | 78 | 68 | 0.17 |

TABLE 2-4

| | Particles | Particle characteristics | | | | | Biodegradation, 60 days (%) Good if 60% or higher; best if 95% or higher | Percentage change in particle diameter (%) Good if lower than 1%; best if 0.15% or lower |
|---|---|---|---|---|---|---|---|---|
| | | Particle diameter (μm) | GSDv (−) | Sphericity (−) | Mn (−) | Surface smoothness (%) | | |
| Comparative Example 1 | Par309 | 7 | 1.44 | 0.98 | 46000 | 85 | 75 | 1.35 |
| Comparative Example 2 | Par311 | 6 | 1.42 | 0.97 | 46000 | 95 | 94 | 1.25 |
| Comparative Example 3 | Par355 | 6 | 1.18 | 0.98 | 47000 | 81 | 85 | 1.25 |
| Comparative Example 4 | Par357 | 6 | 1.19 | 0.98 | 47000 | 86 | 94 | 1.1 |
| Comparative Example 5 | Par101 | 14 | 1.17 | 0.97 | 110000 | 98 | 79 | 2.75 |
| Comparative Example 6 | Par102 | 14 | 1.32 | 0.98 | 110000 | 90 | 25 | 2.15 |
| Comparative Example 7 | Par103 | 12 | 1.47 | 0.55 | 110000 | 45 | 24 | 2.05 |
| Comparative Example 8 | Par104 | 12 | 1.94 | 0.98 | 48000 | 90 | 55 | 1.15 |
| Comparative Example 9 | Par105 | 10 | 1.86 | 0.97 | 45000 | 82 | 78 | 2.75 |
| Comparative Example 10 | Par111 | 10 | 1.67 | 0.96 | 21000 | 82 | 80 | 2.55 |
| Comparative Example 11 | Par112 | 12.7 | 1.72 | 0.96 | 12000 | 79 | 80 | 2.5 |
| Comparative Example 12 | Par113 | 4 | 1.87 | 0.95 | 44000 | 90 | 78 | 2.45 |
| Comparative Example 13 | Par114 | 8.2 | 1.88 | 0.96 | 45000 | 90 | 79 | 2.35 |

These results indicate that the cellulosic particles according to the Examples may achieve high biodegradability and a reduced hygroscopic change in particle diameter compared with the cellulosic particles according to the Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A cellulosic particle comprising:
   a core particle containing 90 parts by mass or more and 99.5 parts by mass or less of cellulose and 0.5 parts by mass or more and 10 parts by mass or less of a cellulose derivative;
   a first coating layer covering the core particle and containing at least one selected from the group consisting of a polyamine compound, a linear-chain saturated fatty acid, a hydroxy fatty acid, and an amino acid compound; and
   a second coating layer covering the first coating layer and containing a wax and a polyvalent metal salt,
   wherein a volume-average particle diameter of the cellulosic particles is 3 $\mu$m or more and less than 10 $\mu$m,
   wherein the cellulose derivative is a cellulose acylate, and a degree of substitution of the cellulose acylate is 1.9 or more and 2.6 or less.

2. The cellulosic particle according to claim 1, wherein the polyamine compound is at least one selected from the group consisting of polyethyleneimine and polylysine.

3. The cellulosic particle according to claim 1, wherein the wax is carnauba wax.

4. The cellulosic particle according to claim 2, wherein the wax is carnauba wax.

5. The cellulosic particle according to claim 1, further comprising at least one external additive selected from the group consisting of a silicon-containing compound particle and a metallic soap particle.

6. The cellulosic particle according to claim 5, comprising a silica particle as the silicon-containing compound particle.

7. The cellulosic particle according to claim 1, wherein an upper geometric standard deviation by number GSDv of the cellulosic particles is 1.0 or greater and 1.7 or less.

8. The cellulosic particle according to claim 1, wherein sphericity of the cellulosic particle is 0.9 or greater.

9. The cellulosic particle according to claim 1, wherein a number-average molecular weight of the cellulose is 37000 or more.

10. The cellulosic particle according to claim 9, wherein the number-average molecular weight of the cellulose is 45000 or more.

11. The cellulosic particle according to claim 1, wherein surface smoothness of the cellulosic particle is 80% or higher.

12. A cellulosic particle comprising:
    a core particle containing the 90 parts by mass or more and 99.5 parts by mass or less of cellulose and the 0.5 parts by mass or more and 10 parts by mass or less of a cellulose derivative; and
    a coating layer covering the core particle and containing at least one selected from the group consisting of a polyamine compound, a wax, a linear-chain saturated fatty acid, a hydroxy fatty acid, and an amino acid compound,
    wherein a volume-average particle diameter of the cellulosic particles is 3 $\mu$m or more and less than 10 $\mu$m,
    wherein the coating layer has a first coating layer covering the core particle and containing at least one selected from the group consisting of a polyamine compound, a linear-chain saturated fatty acid, a hydroxy fatty acid, and an amino acid compound and a second coating layer covering the first coating layer and containing a wax, and a polyvalent metal salt.

* * * * *